US009920392B2

(12) United States Patent
Fitch et al.

(10) Patent No.: US 9,920,392 B2
(45) Date of Patent: Mar. 20, 2018

(54) APPARATUS FOR INDUCTION HARDENING

(71) Applicant: The Timken Company, North Canton, OH (US)

(72) Inventors: Stephen B. Fitch, Massillon, OH (US); Jerry Mills, Massillon, OH (US); William Stuehr, North Royalton, OH (US); John Gadus, Richfield, OH (US); Stephen P. Johnson, North Canton, OH (US)

(73) Assignee: The Timken Company, North Canton, OH (US)

( * ) Notice: Subject to any disclaimer, the term of this patent is extended or adjusted under 35 U.S.C. 154(b) by 509 days.

(21) Appl. No.: 14/630,706

(22) Filed: Feb. 25, 2015

(65) Prior Publication Data

US 2015/0167109 A1 Jun. 18, 2015

Related U.S. Application Data

(62) Division of application No. 12/901,739, filed on Oct. 11, 2010, now Pat. No. 8,993,942.

(51) Int. Cl.
*H05B 6/10* (2006.01)
*H05B 6/22* (2006.01)
(Continued)

(52) U.S. Cl.
CPC ............. *C21D 9/0062* (2013.01); *C21D 1/42* (2013.01); *H05B 6/101* (2013.01); *H05B 6/405* (2013.01)

(58) Field of Classification Search
CPC . H05B 6/02; H05B 6/06; H05B 6/101; H05B 6/102; H05B 6/108; H05B 6/109;
(Continued)

(56) References Cited

U.S. PATENT DOCUMENTS 2,308,788 A 1/1943 Somes
2,912,522 A 11/1959 Knowles et al.
(Continued)

FOREIGN PATENT DOCUMENTS

BE 441547 4/1941
BE 485416 11/1948
(Continued)

OTHER PUBLICATIONS

Article 94(3) Communication received from the EPO for European Appl. No. 10768343.5-1362, dated May 15, 2015, 6 pages.
(Continued)

*Primary Examiner* — Hung D Nguyen
(74) *Attorney, Agent, or Firm* — Michael Best & Friedrich LLP

(57) ABSTRACT

An apparatus for magnetic induction hardening of a workpiece includes a magnetic tool having a body portion formed of a generally non-magnetic material. The body portion has a surface configured to be positioned in close proximity to the workpiece being hardened. The apparatus further includes a magnetic arrangement coupled to the body portion at or adjacent the surface of the body portion and configured to provide regions of alternating polarity. A workpiece holder is configured to support the workpiece in close proximity to the surface of the magnetic tool. A drive arrangement for rotating the magnetic tool relative to the workpiece holder about an axis of rotation is provided to induce heating of the workpiece to achieve a temperature in the austenitic range of the workpiece resulting in hardening of the workpiece through a microstructural transformation.

28 Claims, 18 Drawing Sheets

(51) Int. Cl.
*C21D 9/00* (2006.01)
*H05B 6/40* (2006.01)
*C21D 1/42* (2006.01)

(58) Field of Classification Search
CPC ........ H05B 6/40; H05B 6/405; C21D 9/0062; C21D 9/34; C21D 1/10; C21D 1/32; C21D 1/42; C21D 1/667
USPC ....... 219/600, 641, 644, 647, 639, 635, 672, 219/676, 649, 642, 643
See application file for complete search history.

(56) References Cited

U.S. PATENT DOCUMENTS

| | | | |
|---|---|---|---|
| 3,272,956 A | | 9/1966 | Baermann |
| 3,372,261 A | | 3/1968 | Porterfield |
| 3,629,093 A | | 12/1971 | Sickels |
| 3,684,852 A | | 8/1972 | Seyfried |
| 4,481,397 A | | 11/1984 | Maurice et al. |
| 4,486,638 A | | 12/1984 | de Bennetot |
| 4,523,083 A | * | 6/1985 | Hamilton ............ A47J 36/2461 219/432 |
| 4,675,488 A | | 6/1987 | Mucha et al. |
| 4,761,527 A | | 8/1988 | Mohr |
| 4,855,551 A | | 8/1989 | Mucha et al. |
| 4,894,501 A | | 1/1990 | Pfaffmann et al. |
| 5,012,060 A | | 4/1991 | Gerard |
| 5,134,264 A | | 7/1992 | Burger et al. |
| 5,213,636 A | * | 5/1993 | Akers ...................... C21D 1/10 219/640 |
| 5,234,201 A | | 8/1993 | Chatterjee et al. |
| 5,344,536 A | * | 9/1994 | Obuchi ................. C23C 16/511 219/121.41 |
| 5,550,354 A | | 8/1996 | Kimura et al. |
| 5,684,352 A | | 11/1997 | Mita et al. |
| 5,746,580 A | | 5/1998 | Parket et al. |
| 5,914,065 A | | 6/1999 | Alavi |
| 6,144,020 A | | 11/2000 | Usui et al. |
| 6,177,660 B1 | | 1/2001 | Usui et al. |
| 6,250,875 B1 | | 6/2001 | Bauer et al. |
| 6,303,908 B1 | | 10/2001 | Yamaga et al. |
| 6,297,484 B1 | | 11/2001 | Usui et al. |
| 6,331,744 B1 | | 12/2001 | Chen et al. |
| 6,538,239 B1 | * | 3/2003 | Anderson ................ H05B 6/02 219/635 |
| 6,555,800 B1 | | 4/2003 | Zahn |
| 6,833,107 B2 | | 12/2004 | Kuriyama et al. |
| 6,933,460 B2 | | 8/2005 | Vanden Brande et al. |
| 7,146,735 B2 | | 12/2006 | Bracht et al. |
| 7,179,416 B2 | | 2/2007 | Ueno |
| 7,258,526 B2 | | 8/2007 | Dooley et al. |
| 7,339,144 B2 | | 3/2008 | Lunneborg |
| 7,339,145 B2 | | 3/2008 | Magnusson |
| 8,283,615 B1 | * | 10/2012 | Albertson ............. H05B 6/108 219/628 |
| 8,389,911 B2 | | 3/2013 | Matsui |
| 2006/0086729 A1 | | 4/2006 | Lunneborg |
| 2006/0124632 A1 | | 6/2006 | Stuer et al. |
| 2006/0157476 A1 | | 7/2006 | Magnusson |

FOREIGN PATENT DOCUMENTS

| | | |
|---|---|---|
| CN | 201056580 | 5/2008 |
| DE | 956259 | 1/1957 |
| DE | 10154100 | 5/2003 |
| EP | 1293577 A2 | 3/2003 |
| EP | 1400603 | 3/2004 |
| FR | 2536943 | 6/1984 |
| FR | 2536943 A1 | 6/1984 |
| GB | 2111360 | 6/1983 |
| JP | 57169522 | 10/1982 |
| JP | S60-892 | 1/1985 |
| JP | 60162726 | 8/1985 |
| JP | 62127419 | 6/1987 |
| JP | 01086474 | 3/1989 |
| JP | 04149988 | 5/1992 |
| JP | 05082248 | 4/1993 |
| JP | 07220863 | 8/1995 |
| JP | 2003278558 | 10/2003 |
| JP | 2005174801 | 6/2005 |
| JP | 60141827 | 7/2005 |
| WO | WO9939769 | 8/1999 |
| WO | WO02/087285 | 10/2002 |
| WO | WO03053103 | 6/2003 |
| WO | WO2005/043722 | 12/2005 |
| WO | WO2009/126850 | 10/2009 |
| WO | WO2010100082 | 9/2010 |
| WO | WO2011020952 | 2/2011 |

OTHER PUBLICATIONS

Takashi Watanabe, Takashi Todaka, Analysis of a New Induction Heating Device by Using Permanent Magnets, IEEE Transactions on Magnetics, vol. 41, No. 5, May 2005, 4 pages.

Invitation to Pay Additional Fees and, Where Applicable, Protest Fee from International Searching Authority and Communication Relating to the Results of the Partial International Search for PCT/US2010/052154, dated Jul. 18, 2011, 8 pages.

Search Report and Written Opinion for PCT/US2010/052154 dated Oct. 5, 2011, 15 pages.

English translation of Chinese Office action in Chinese Appl. No. 201080070657.5, dated Mar. 17, 2014, 9 pages.

Office action received from USPTO for U.S. Appl. No. 12/937,042, dated Jul. 17, 2014, 31 pages.

Translation of Office action dated May 21, 2014 for Japanese Patent Appl. No. 2013-533825, 3 pages.

Extended European Search Report for Application No. 17160400.2 dated May 11, 2017 (5 pages).

* cited by examiner

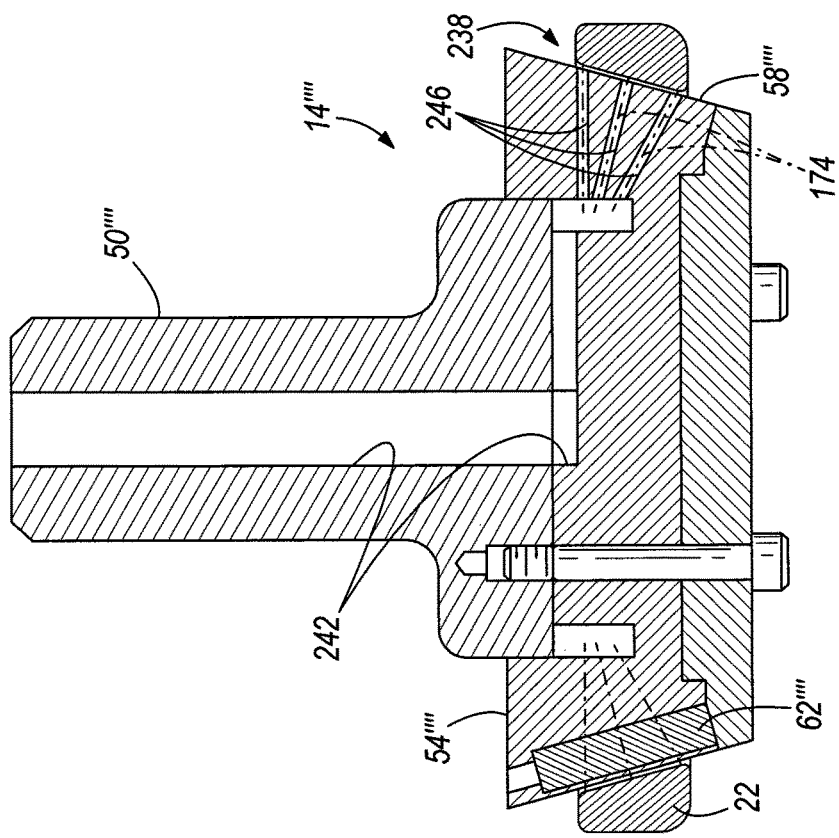
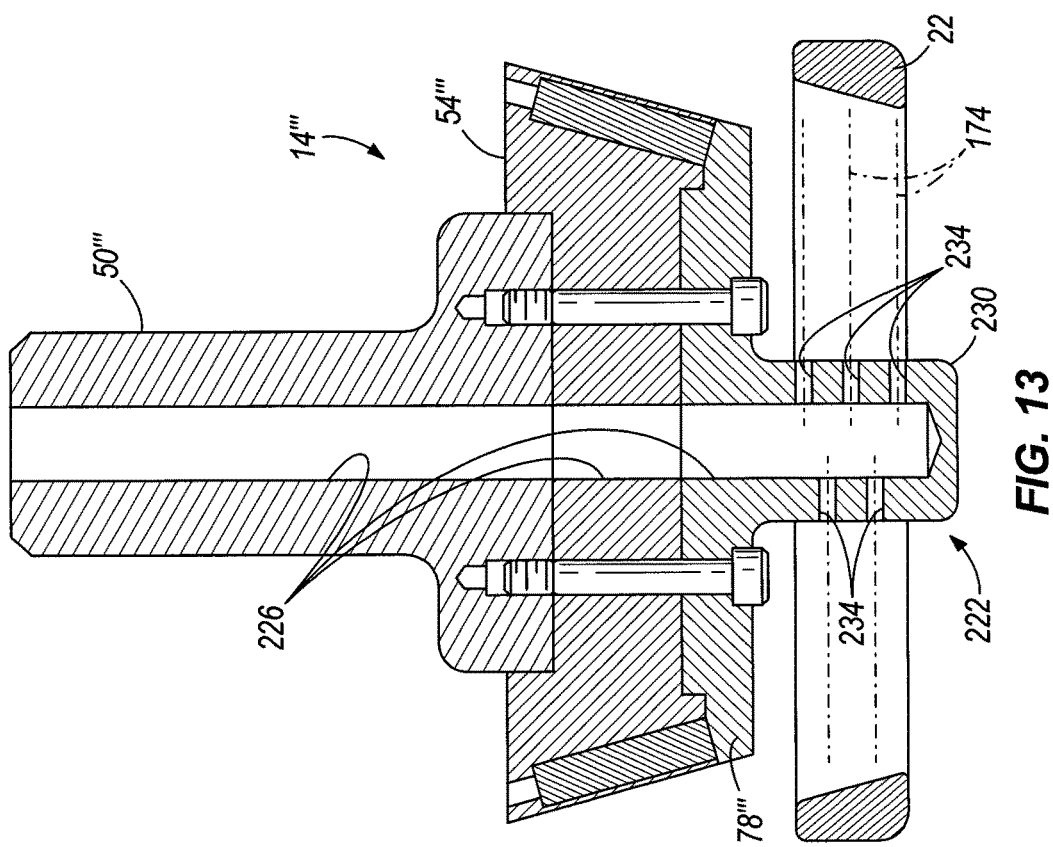

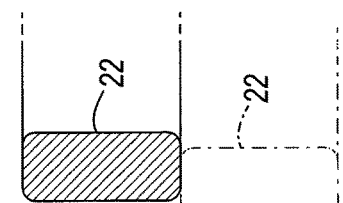
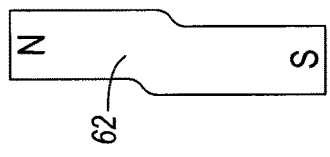
FIG. 19
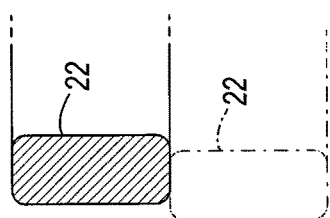
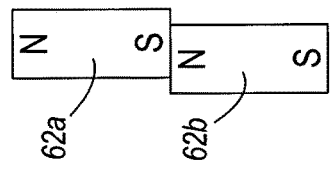
FIG. 18
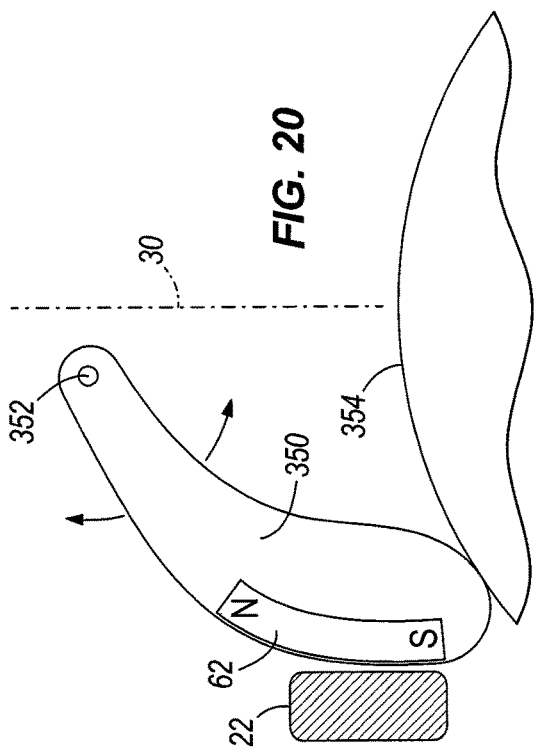
FIG. 20
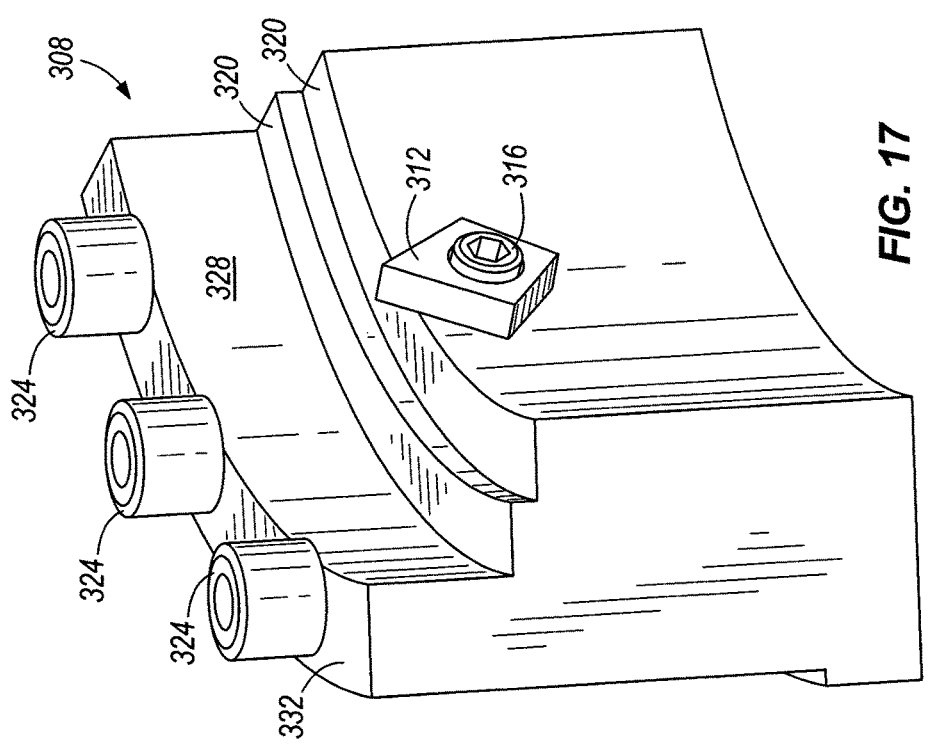
FIG. 17

APPARATUS FOR INDUCTION HARDENING

RELATED APPLICATIONS

This application is a divisional of U.S. patent application Ser. No. 12/901,739 filed on Oct. 11, 2010, the entire content of which is hereby incorporated by reference.

BACKGROUND

The present invention relates to magnetic induction heating of components, and more specifically to an apparatus for use in magnetic induction hardening (e.g., case hardening or through hardening) of components.

Case hardening through induction heating is commonly performed using copper coils or inductors energized with alternating current from a power supply. The hardening depth achieved by the inductor is a function of the AC frequency applied, as determined by the power supply and the transformer. The surface area hardened is a function of the power available from the power supply and the geometry of the inductor.

The geometry of the inductor must be carefully tailored to the part being hardened to prevent overheating of portions of the part. This specific geometry of the inductor must also be carefully coordinated with a power supply of particular frequency range. The close design ties between the inductor and the power supply yields an induction system that is largely dictated by, and therefore dedicated to, the particular part being hardened. For different parts, different inductors with different power supplies must be used, leading to an inflexible process resulting in a high cost of part-dedicated tooling. Electricity consumption for these conventional induction heating systems is also high, further increasing the cost of the process.

SUMMARY

In one embodiment, the invention provides an apparatus for magnetic induction hardening of a workpiece. The apparatus includes a magnetic tool having a body portion formed of a generally non-magnetic material. The body portion has a surface configured to be positioned in close proximity to the workpiece being hardened. The apparatus further includes a magnetic arrangement coupled to the body portion at or adjacent the surface of the body portion and configured to provide regions of alternating polarity. A workpiece holder is configured to support the workpiece in close proximity to the surface of the magnetic tool. A drive arrangement for rotating the magnetic tool relative to the workpiece holder about an axis of rotation is provided to induce heating of the workpiece to achieve a temperature in the austenitic range of the workpiece resulting in hardening of the workpiece through a microstructural transformation.

In one aspect of the invention, the magnetic arrangement defines a number of magnetic poles (nP), the drive arrangement rotates the tool relative to the workpiece holder at a speed (RPM), and a frequency of at least 5 kHz is achieved according to the equation Hz=(nP*RPM)/60.

In another aspect of the invention, the apparatus further includes a quenching system operable to quench the heated workpiece while it is supported by the workpiece holder.

In yet another aspect of the invention, the workpiece holder supports the workpiece to prevent rotation of the workpiece about the axis of rotation and to prevent translation of the workpiece in the workpiece holder along the axis or rotation, while accommodating for thermal expansion of the workpiece in the workpiece holder.

In yet a further aspect of the invention, the magnetic arrangement includes a plurality of permanent magnets coupled to the body portion at or adjacent the surface, and configured to provide the regions of alternating polarity. The body portion can include a plurality of pockets formed therein and spaced from the surface such that a wall portion of the body is defined between the surface and each of the plurality of pockets. Each of the plurality of magnets is positioned in a respective one of the plurality of pockets.

In another aspect of the invention, the magnetic arrangement includes a member that is magnetized to include a plurality of magnetic regions, the magnetic regions defining the regions of alternating polarity. The member can take the form of a ring, and can be connected to the body portion to define the surface.

Other aspects of the invention will become apparent by consideration of the detailed description and accompanying drawings.

BRIEF DESCRIPTION OF THE DRAWINGS

FIG. 13 is a section view of a magnetic tool having an integral quenching system according to another embodiment of the invention.

FIG. 14 is a section view of yet another magnetic tool having an integral quenching system according to another embodiment of the invention.

FIG. 17 is a perspective view of an alternative collet pad for use with the workpiece holder of FIG. 15.

FIG. 18 is a schematic view of a magnet arrangement to accommodate for workpiece expansion.

FIG. 19 is a schematic view of another magnet arrangement to accommodate for workpiece expansion.

FIG. 20 is a schematic view of yet another magnet arrangement to accommodate for workpiece expansion.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
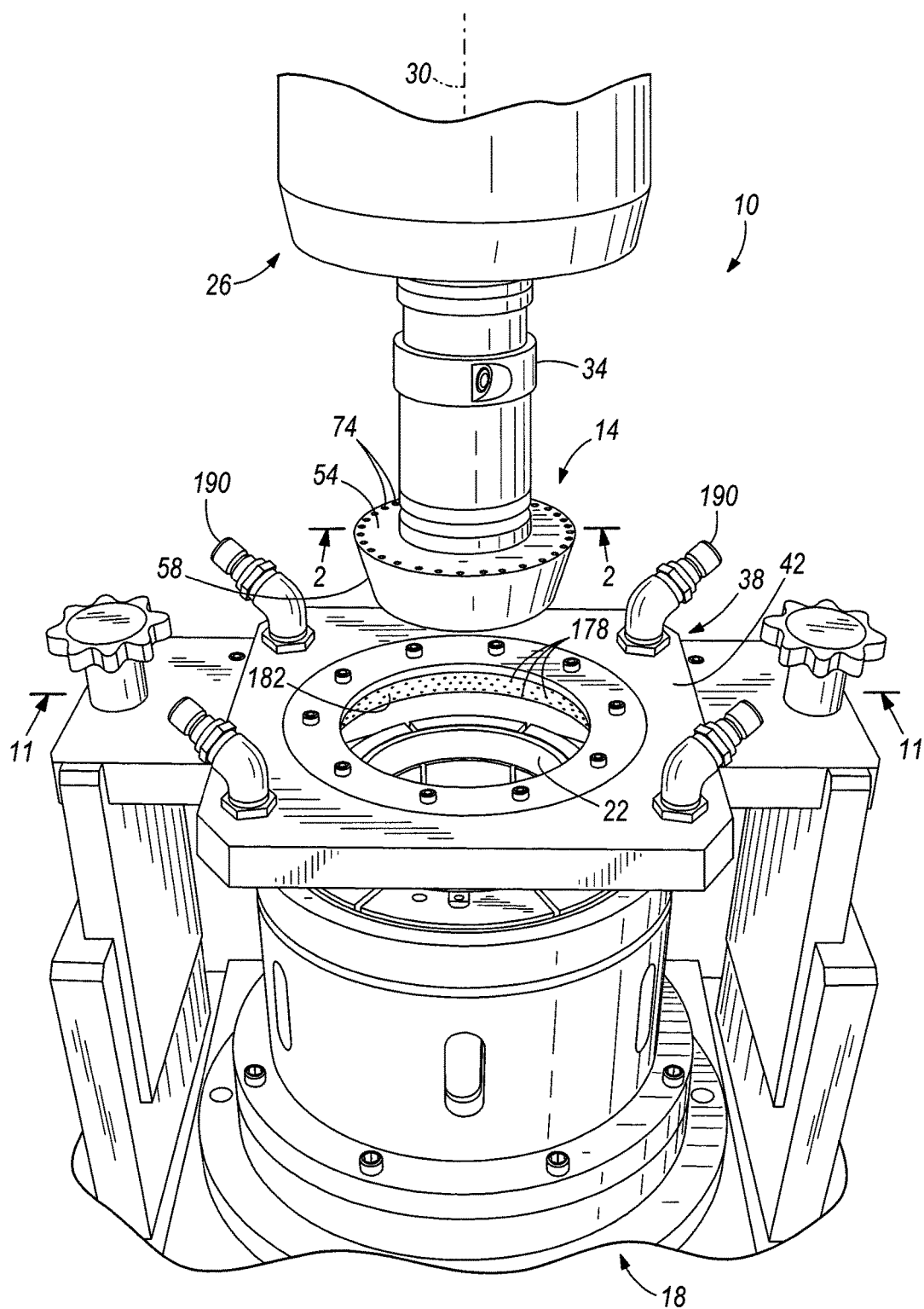
FIG. 1 is a partial perspective view of an apparatus for magnetic induction hardening of a workpiece embodying the present invention.

FIG. 1 illustrates a magnetic induction hardening apparatus 10 according to the present invention. The illustrated apparatus includes a magnetic tool 14 and a workpiece holder 18 configured to support a workpiece 22 to be induction hardened. In the illustrated embodiment, the workpiece 22 is an annular ring such as that which would be used as a raceway for a bearing, however, the invention is applicable and adaptable for hardening workpieces of varying geometries.

A drive arrangement in the form of a rotary drive unit 26 is provided for rotating the magnetic tool 14 relative to the workpiece holder 18 (and therefore the workpiece 22) about an axis of rotation 30 to induce heating of the workpiece 22 to achieve a temperature in the austenitic range of the workpiece 22 resulting in hardening of the workpiece 22 through a microstructural transformation, as is understood by those skilled in the art of heat treating and hardening. While the drive unit 26 is illustrated as including a spindle 34 operable to support the magnetic tool 14 for rotation, in other embodiments, the drive unit 26 could be operable to rotate the workpiece holder 18 or the workpiece itself 22 while the magnetic tool 14 remains stationary. In yet another embodiment, two drive units 26 could be provided, one to rotate the magnetic tool 14 and the other to rotate the workpiece holder 18 and the workpiece 22.

The illustrated apparatus 10 further includes a quenching system 38 operable to quench the heated workpiece 22 while it is supported by the workpiece holder 18. Integrating the quenching system 38 with the induction hardening apparatus 10 simplifies and economizes the induction hardening process. The illustrated quenching system 38 includes a quench collar 42 surrounding the workpiece 22 for showering the workpiece with a quenching medium (e.g., water or other quenching fluids) to transform the austenite into martensite. The apparatus can be enclosed in a housing (not shown) to contain and collect the quenching medium and to protect the operator from the heat generated during the induction hardening process. As will be described further below, the illustrated quench collar 42 is only one possible type of quenching system 38 that can be integrated with the apparatus 10. In yet other embodiments, the quenching function need not be integrated into the apparatus 10, but can be performed at a separate quench station remote from the apparatus 10. In such case, the heated workpiece 22 would be removed from the workpiece holder 18 and transported to the remote quench station for quenching.

Figure 2:
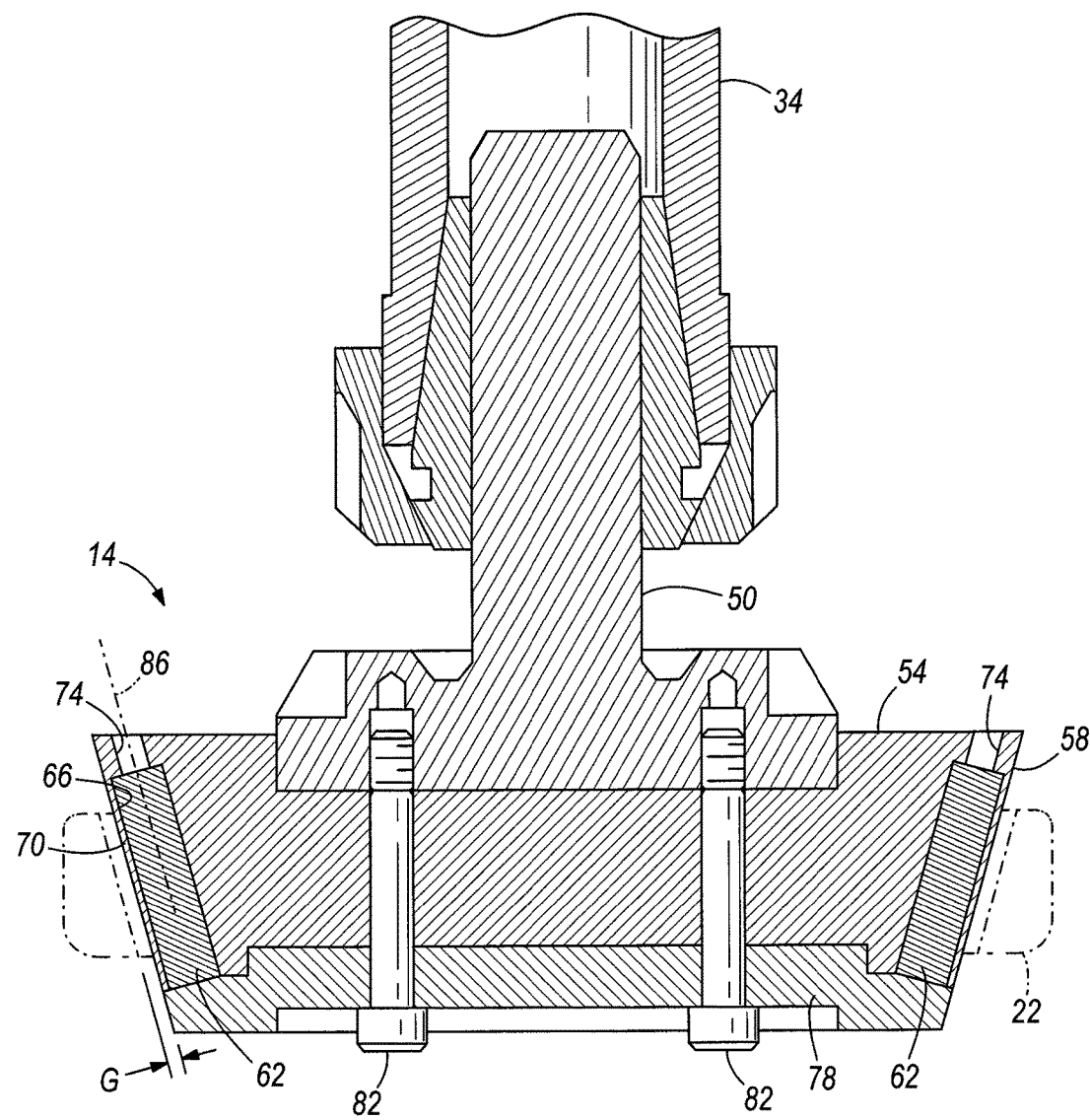
FIG. 2 is a cross-sectional view of the magnetic tool of FIG. 1.
Figure 3:
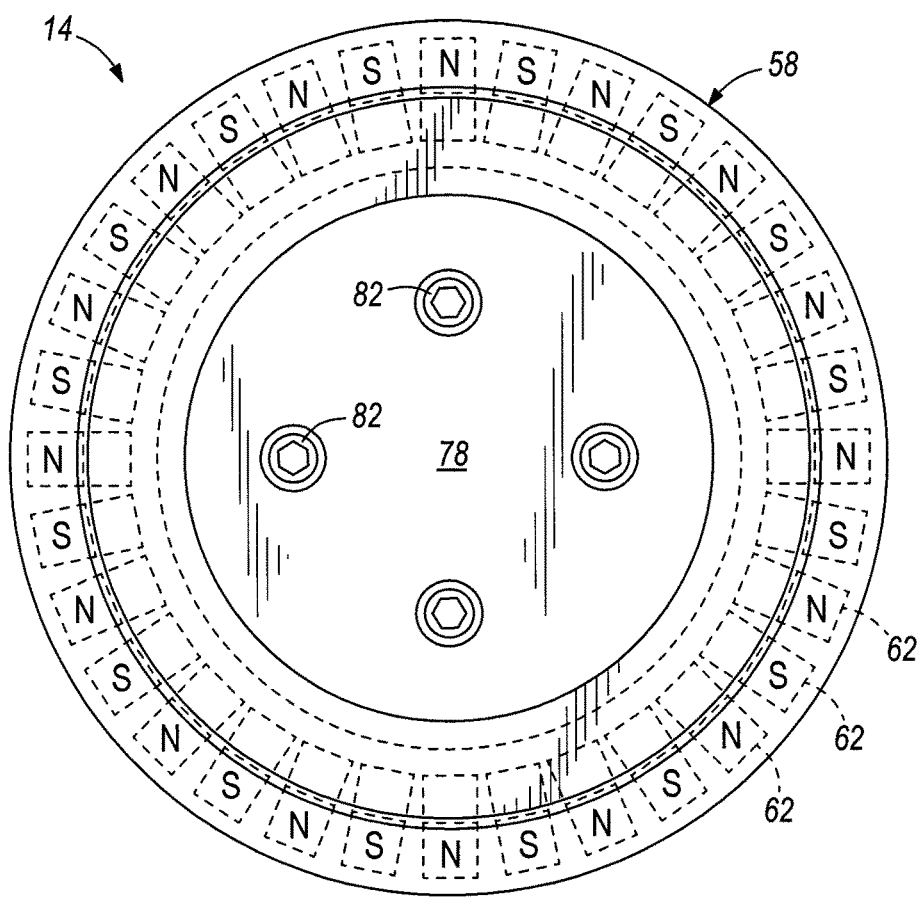
FIG. 3 is an end view of the magnetic tool of FIG. 1.
Figure 4:
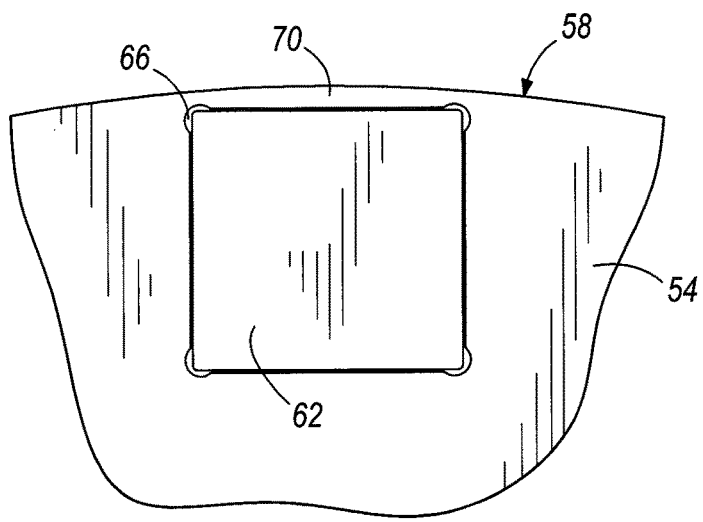
FIG. 4 is an enlarged partial view of a portion of the magnetic tool of FIG. 1 showing a pocket for housing a magnet.

FIGS. 2-4 illustrate the magnetic tool 14 in greater detail. The illustrated magnetic tool 14 includes a mounting portion 50 in the form of a drive shaft, and a body portion 54 coupled to the mounting portion 50. The mounting portion 50 can be releasably secured to the spindle 34, which is coupled to the drive unit 26 for rotation therewith (see FIG. 1). The mounting portion 50 and the body portion 54 are each formed of a generally non-magnetic material or a material deemed to have a low relative permeability, such as aluminum or austenitic stainless steel. The body portion 54 defines a surface 58 configured to be positioned in close proximity to the workpiece 22. As best illustrated in FIGS. 1 and 2, the illustrated body surface 58 is a radially outwardly-facing circumferential surface that is tapered to correspond to the taper present on the inner surface of the annular workpiece 22. As shown in FIG. 2, an air gap G is defined between the surface 58 and the inner surface of the workpiece 22 that is being hardened (as supported by the workpiece holder 18). In the illustrated embodiment, the air gap G is less than about 0.07 inches, can be between about 0.02 inches and about 0.06 inches, and is shown as being about 0.02 inches. Of course, with workpieces of differing geometries, the geometry of the surface 58 and the size of the air gap G can be adjusted accordingly to achieve the desired hardening results. These capabilities will be discussed in further detail below.

The magnetic tool 14 includes a magnetic arrangement that, in this embodiment, takes the form of a plurality of permanent magnets 62 coupled to the body portion 54 at or adjacent the surface 58. In the embodiment illustrated in FIGS. 1-4, the plurality of permanent magnets 62 are housed in respective pockets 66 defined or formed in the body portion 54 to be spaced from the surface 58 such that a thin wall portion 70 of the body portion 54 is defined between the surface 58 and each of the plurality of pockets 66. As such, the magnets 62 are coupled to the body portion 54 via their placement in the pockets 66 at a location adjacent the surface 58. The wall portion 70 separating the pockets 66 from the surface 58 provides a thermal barrier between the magnets 62 and the heated workpiece 22 so that the temperature of the magnets 62 is less likely to reach the Curie temperature of the magnets 62, or the temperature at which the magnets 62 lose their magnetic characteristics (i.e., become paramagnetic). The wall portion 70 can be less than 0.05 inches thick, and in the illustrated embodiment is about 0.02 inches thick. In manufacturing the body portion 54 of the magnetic tool 14 to achieve the desired thin wall portion 70, the pockets 66 can be formed prior to the machining or turning process used to form the finished surface 58.

The magnets 62 are inserted into the pockets 66 with a tight fit such that the magnets 62 will not substantially move around within the pockets 66. If the magnets 62 were allowed to move around substantially within the pockets 66, the balance of the magnetic tool 14 could be adversely affected. Apertures 74 (see FIGS. 1 and 2) are formed to communicate between the pockets 66 and the environment. When the magnets 62 are inserted into the pockets 66, air is allowed to escape through the apertures 74 as the tight-fitting magnets 62 slide into the pockets 66. A cover 78 is coupled to the body portion 54 with fasteners 82 once the magnets 62 have been positioned in the pockets 66 to secure the magnets 62 therein. Should the magnets 62 become damaged or degrade from normal usage, the cover 78 can be removed to facilitate replacement of the magnets 62.

In the illustrated embodiments, the cross-section of the magnets 62 as well as the pockets 66 is substantially square in shape, but other cross-sectional shapes (e.g., circular, trapezoidal—see FIG. 4a, etc.) could be substituted. The pockets 66, and therefore the inserted magnets 62, have a longitudinal axis 86 (see FIG. 2) that extends generally parallel to the surface 58. As best represented in FIG. 3, the poles of the magnets 62 (e.g., North—N and South—S poles) are on two opposing elongated faces of the magnets 62 such that their N-S axis extends radially when positioned in the pockets 66. In other words, either a North or South pole faces radially outwardly toward the surface 58. The magnets 62 are inserted into the pockets 66 such that each magnet 62 alternates in polarity from the adjacent magnets 62 around the circumferential periphery of the body portion 54. Thus, the magnets 62 are oriented and positioned in the pockets 66 to provide regions of alternating polarity, or such that an alternating pole/polarity arrangement of N-S-N-S-N-S, etc. is achieved adjacent the surface 58. The illustrated magnetic tool 14 includes thirty-two magnets 62, although as will be discussed below, the number of magnets 62 can be varied as desired. In any of the illustrated magnet arrangements, the magnets 62 should be arranged closely enough together to provide a continuous magnetic field to interact with the workpiece 22 being hardened.

The magnets 62 are preferably rare earth permanent magnets capable of delivering a continuous flux density of greater than 1 Tesla. The illustrated embodiment uses neodymium-iron-boron (NdFeB) magnets of about 1.2 T and a Curie temperature of about 540 degrees Fahrenheit, however, other suitable rare earth magnets can also be used. In an alternative embodiment, ceramic magnets can be alternatingly positioned between every two NdFeB magnets. The orientation of the NdFeB magnets would be constant. The ceramic magnets can be electrically activated to create fields opposite in polarity to the NdFeB magnets. In yet other embodiments, such as that described below in conjunction with FIGS. 30 and 31, the magnetic arrangement need not be comprised of a plurality of individual permanent magnets, but instead can take the form of a member that is magnetized to provide regions of alternating polarity.

Figure 5:
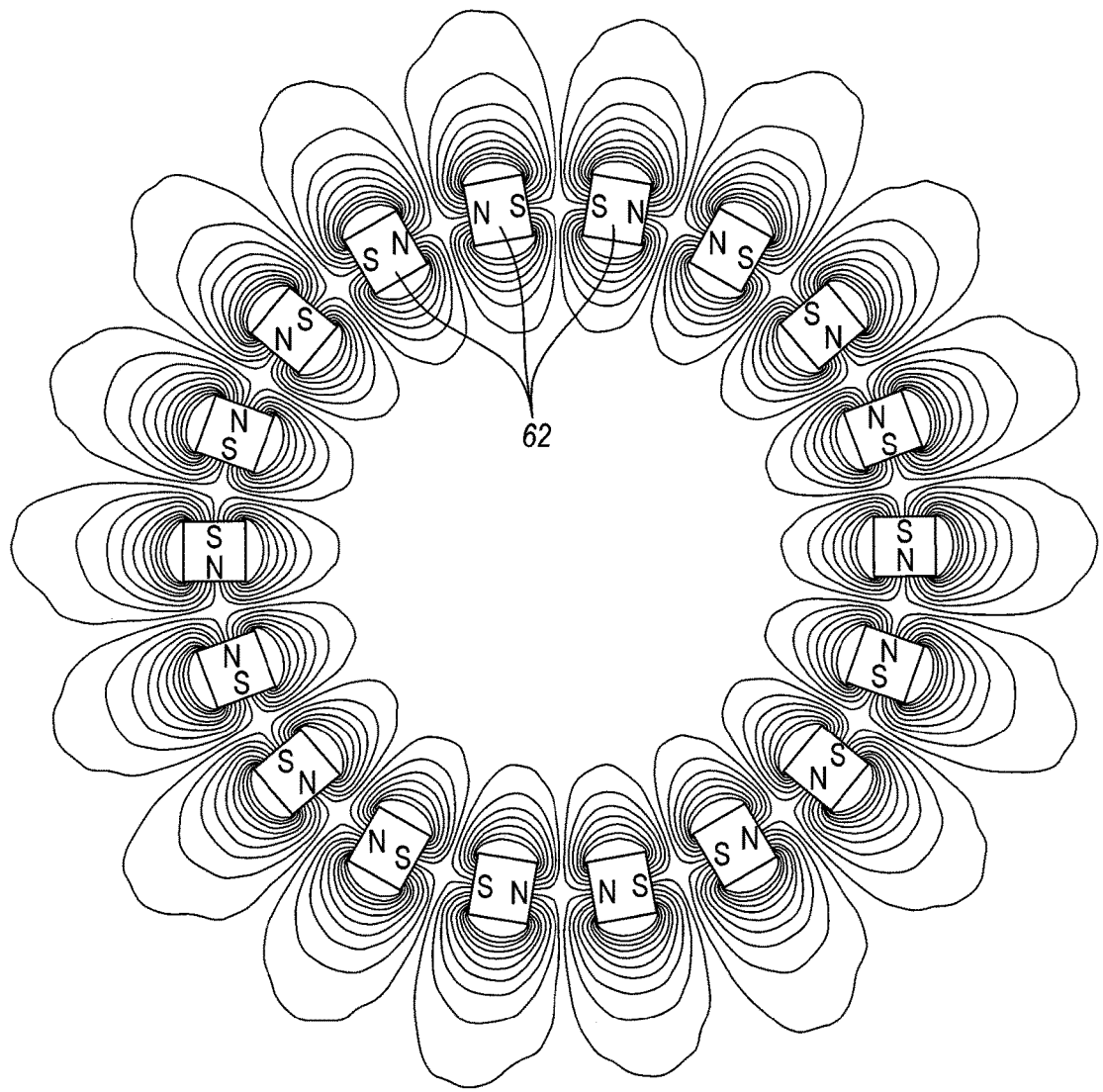
FIG. 5 is a schematic view of an alternate magnet arrangement and corresponding flux diagram from that shown in FIG. 3.
Figure 6:
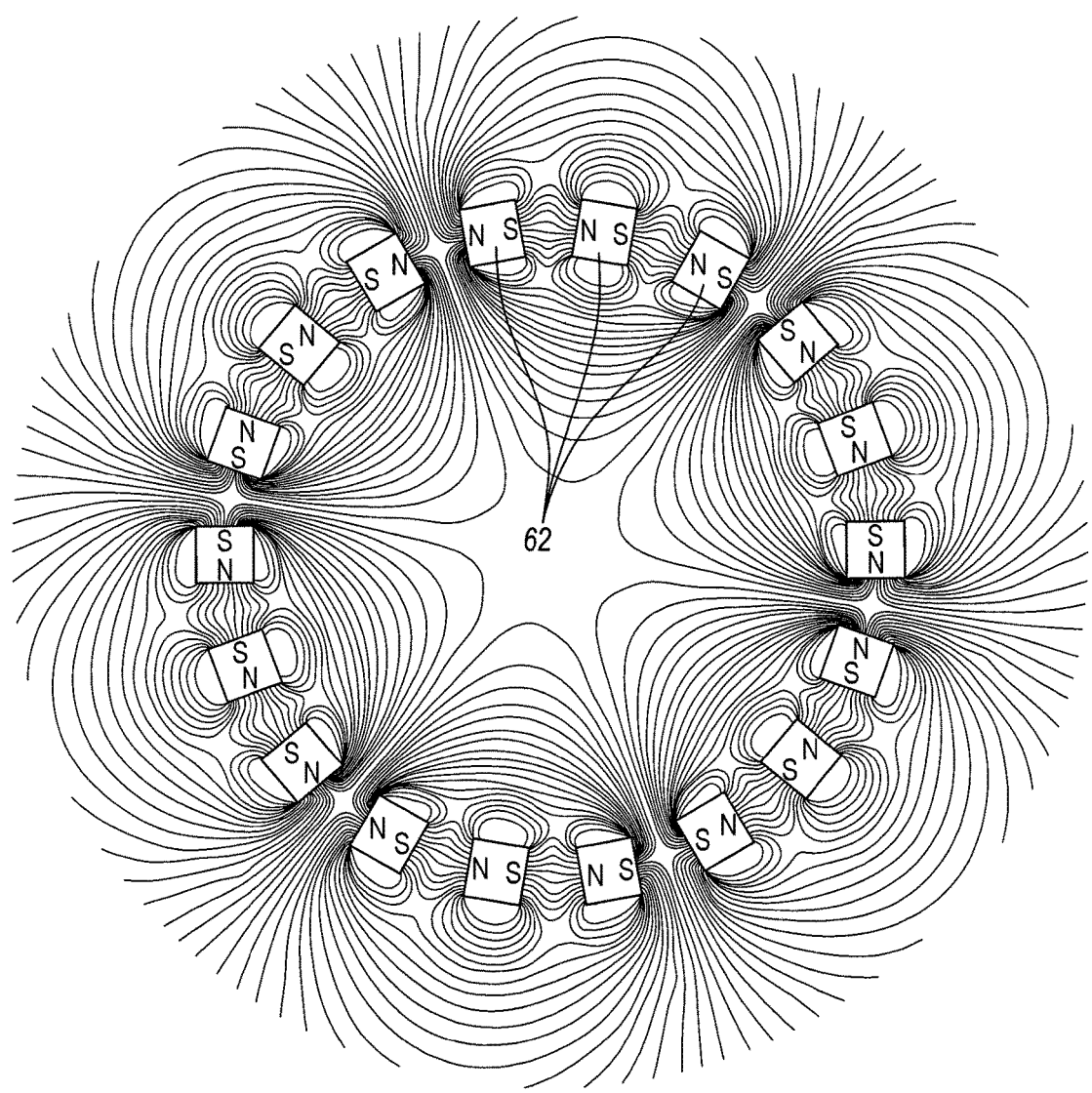
FIG. 6 is a schematic view of yet another alternate magnet arrangement and corresponding flux diagram.

FIGS. 5 and 6 illustrate alternative magnet arrangements that can be used with the magnetic tool 14. In FIG. 5, the pole axis of each magnet 62, when positioned in the pockets 66, would extend circumferentially so that the magnets 62 are arranged as follows S-N|N-S|S-N|N-S|S-N|N-S, etc. to provide the regions of alternating polarity adjacent each magnet 62. By orienting the poles to face each other in the array as shown, it is believed that the adjacent repelling poles would direct more of the magnetic field radially outwardly toward the workpiece 22. FIG. 5 illustrates the flux pattern generated by such an arrangement.

FIG. 6 illustrates an in-line arrangement. The pole axis of each magnet 62, when positioned in the pockets 66, would again extend circumferentially, but the magnets 62 are arranged as follows N-S|N-S|N-S|S-N|S-N|S-N|N-S|N-S|N-S|S-N|S-N|S-N|, etc. In this arrangement, the middle grouping of 3 adjacent magnets is oriented in the same direction, S-N|S-N|S-N|, while the groupings of 3 adjacent magnets on either side of the middle grouping is oriented as N-S|N-S|N-S|. With this arrangement, each grouping of three adjacent magnets 62 defines a region of an alternating polarity from the adjacent groupings of magnets 62. With the eighteen magnet array shown, there would be six poles. FIG. 6 illustrates the resulting flux pattern.

Figure 4A:
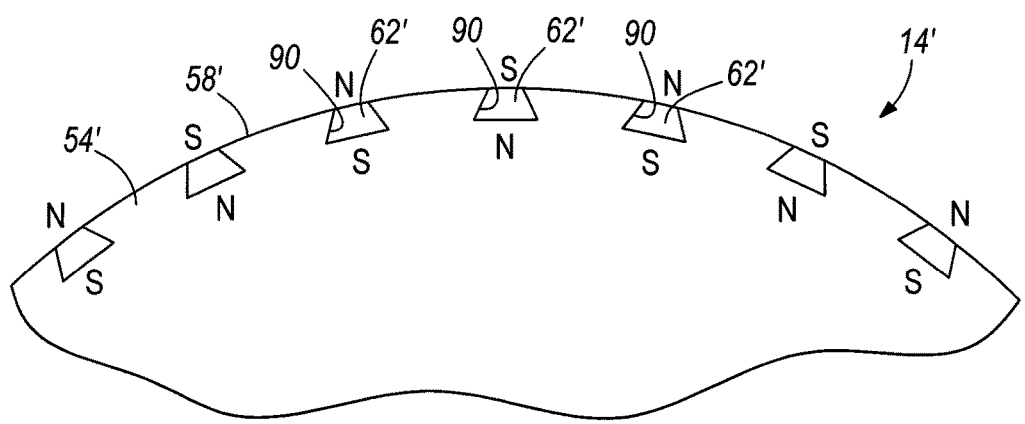
FIG. 4a is a schematic view showing an alternative pocket arrangement for housing magnets.

FIG. 4a illustrates an alternative embodiment of magnet pockets 90 that can be used on the magnetic tool 14'. Each of the plurality of magnets 62' is positioned in a respective pocket 90 such that a surface of each of the plurality of magnets 62' is exposed to at least partially define the surface 58' of the body portion 54'. There is no thin wall portion separating the magnets 62' from the surface 58'. As shown in FIG. 4a, the pockets 90 and magnets 62' are of a trapezoidal or dovetail configuration such that the magnets 62' can be inserted axially into the pockets 90, yet are retained radially within the pockets 90 due to the geometry of the pockets 90 and the magnets 62'.

The required speed or rotational rate (RPM) at which the magnetic tool 14 (and therefore the magnets 62) are rotated relative to the workpiece 22 is a function of the number of magnetic poles formed based on the configuration of the magnets 62. The formula equating the frequency (Hz), the number of poles (nP), and the rotational rate (RPM) is set forth as Hz=(nP*RPM)/60. The factor of 60 is to convert the RPM to revolutions per second (RPS), producing a frequency similar to that of a current from a power supply. The frequency is directly proportional to the number of poles and the rotational rate. Therefore, if the rotational rate of the magnetic tool 14 is reduced, the same frequency can be achieved by increasing the number of poles. It has been found that a frequency of at least 5 kHz is needed to achieve heating of the workpiece to the austenitic temperature range needed to achieve the microstructural transformation that results in hardening. Thus a sufficient number of poles coupled with a sufficient rate of rotation can be selected. A range from 5 kHz to 21 kHz can be used for induction hardening depending on the particular workpiece being hardened and the desired hardening results.

In addition to varying the number of poles and the rotational rate of the magnetic tool 14, other variables can affect the heating, and therefore the hardening capabilities of the magnetic tool 14. One variable that can be adjusted as desired is the time it takes for the magnetic tool 14 to achieve the desired RPM, which can be referred to as the "ramp time." The horsepower (torque) of the drive unit 26 determines the minimum ramp time achievable. Another variable that can be adjusted as desired is the time the magnetic tool 14 remains at the desired RPM, which can be referred to as the "soak time." The air gap G is yet another variable that can be adjusted as desired. The size of the air gap G impacts the torque requirements of the drive unit 26, as smaller air gaps G require greater torque to overcome the attraction between the magnetic tool 14 and the workpiece 22. The size of the air gap G also impacts the heating time (i.e., ramp time and soak time) to achieve a desired hardness characteristic (e.g., case depth). All of these variables can be adjusted individually and in conjunction with each other as desired to achieve the desired hardening characteristics (e.g., case depth).

Depending upon the construction of the magnetic tool 14 and the rotational speeds required, a dynamic balancing system may be incorporated to balance the tooling. Whether a balancing system is utilized or not, a concentricity of about 0.004 inches or smaller between the mounting shaft 50 and the magnets 62 should be maintained. This will help provide proper and consistent heating of the workpiece 22 by minimizing the variation in the air gap G during rotation of the magnetic tool 14, thereby helping to achieve the desired hardening results.

Figure 7:
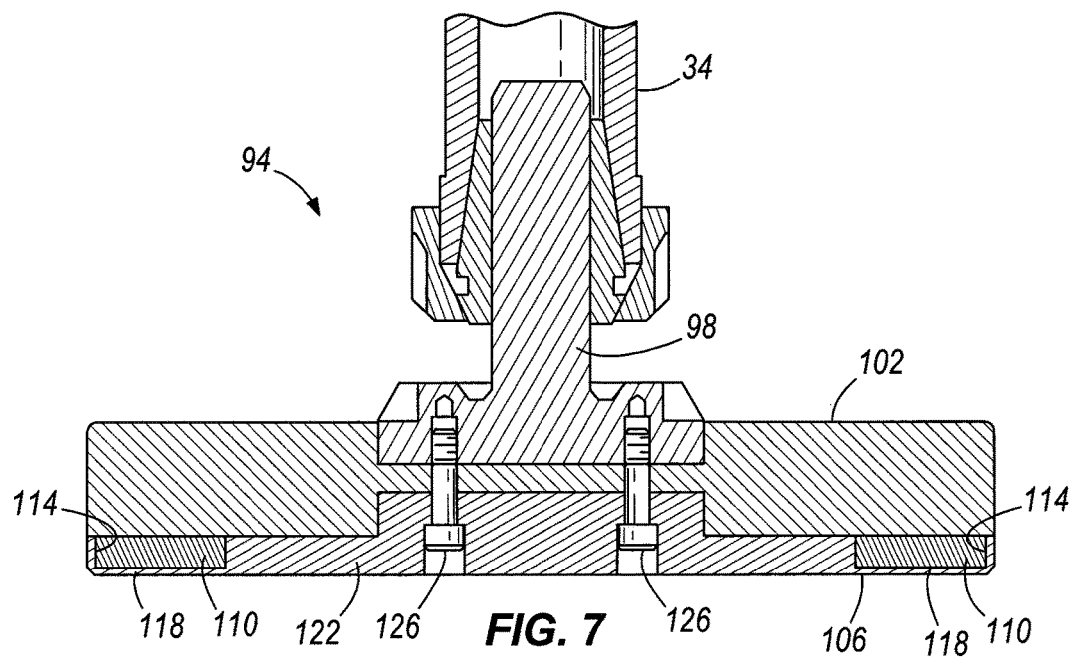
FIG. 7 is a cross-sectional view of another magnetic tool that can be used with the apparatus for magnetic induction hardening shown in FIG. 1.
Figure 8:
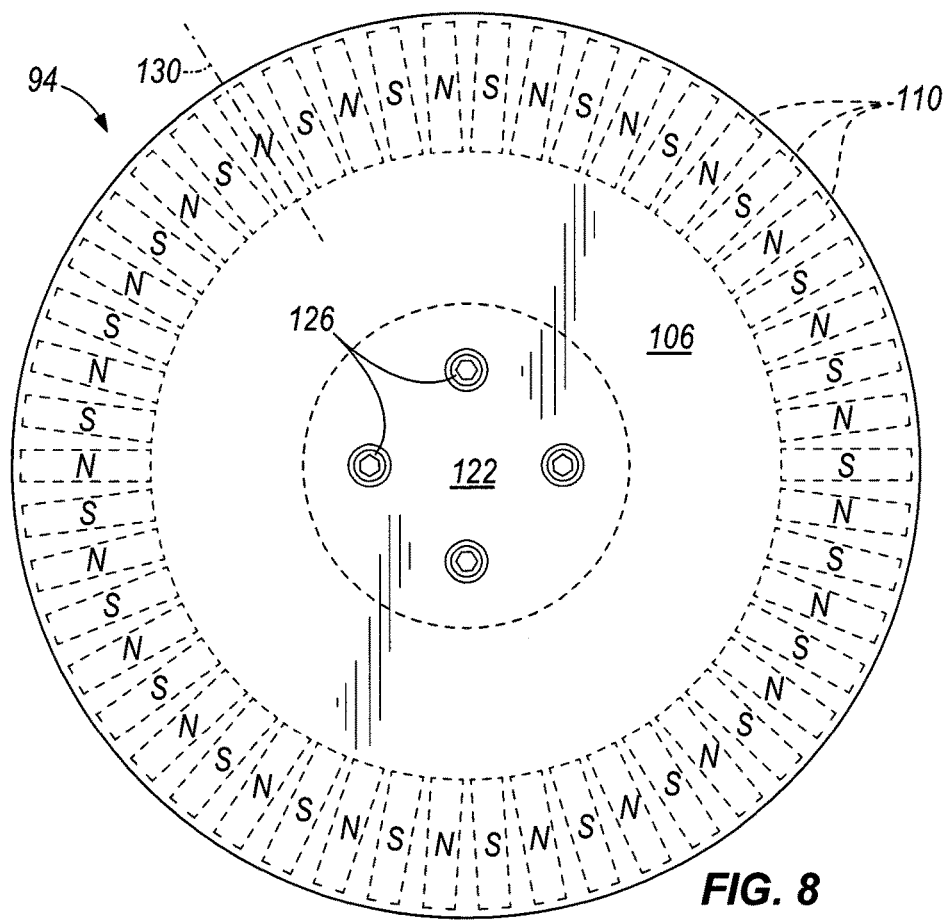
FIG. 8 is an end view of the magnetic tool of FIG. 7.

FIGS. 7 and 8 illustrate another magnetic tool 94 that could be used with the apparatus 10. Like the magnetic tool 14, the tool 94 includes a mounting portion 98 in the form of a drive shaft, and a body portion 102 coupled to the mounting portion 98. The mounting portion 98 can be releasably secured to the spindle 34, which is coupled to the drive unit 26 for rotation therewith (see FIG. 1). The mounting portion 98 and the body portion 102 are each formed of a generally non-magnetic material or a material deemed to have a low relative permeability, such as aluminum or austenitic stainless steel. The body portion 102 defines a surface 106 configured to be positioned in close proximity to a workpiece 22. As best illustrated in FIGS. 7 and 8, the illustrated body surface 106 is an axially-facing end surface of the body portion 102 that is configured to correspond to an end surface of the workpiece 22. Of course, with workpieces of differing geometries, the geometry of the surface 106 can be adjusted accordingly to achieve the desired hardening results.

The magnetic tool 94 includes a magnetic arrangement that, in this embodiment, takes the form of a plurality of permanent magnets 110 coupled to the body portion 102 at or adjacent the surface 106. In the embodiment illustrated in FIGS. 7 and 8, the plurality of permanent magnets 110 are housed in respective pockets 114 defined or formed in the body portion 102 to be spaced from the surface 106 such that a thin wall portion 118 of the body portion 102 is defined between the surface 106 and each of the plurality of pockets 114. As such, the magnets 110 are coupled to the body portion 102 via their placement in the pockets 114 at a location adjacent the surface 106. The wall portion 118 separating the pockets 114 from the surface 106 provides a thermal barrier between the magnets 110 and the heated workpiece 22 so that the temperature of the magnets 110 is less likely to reach the Curie temperature of the magnets 110. The wall portion 118 can be less than 0.05 inches thick, and in the illustrated embodiment is about 0.02 inches thick.

The magnets 110 are inserted into the pockets 114 with a tight fit such that the magnets 110 will not substantially move around within the pockets 114. If the magnets 110 were allowed to move around substantially within the pockets 114, the balance of the magnetic tool 94 could be adversely affected. As shown in FIGS. 7 and 8, the pockets 114 are defined in a cover 122 that is coupled to and forms part of the body portion 102 with fasteners 126 once the magnets 110 have been positioned in the pockets 114. In alternative embodiments, the pockets 114 could be partially or completely formed in the body portion 102 adjacent the cover 122. Should the magnets 110 become damaged or degrade from normal usage, the cover 122 can be removed to facilitate replacement of the magnets 110.

In the illustrated embodiments, the cross-section of the magnets 110 as well as the pockets 114 is substantially square in shape, but other cross-sectional shapes (e.g., circular, trapezoidal—see FIG. 4a, etc.) could be substituted. The pockets 114 and therefore the inserted magnets 110 have a longitudinal axis 130 (see FIG. 8) that extends generally parallel to the surface 106. As best represented in FIG. 8, the poles of the magnets 110 (e.g., North-N and South-S poles) are on two opposing elongated faces of the magnets 110 such that their N-S axis extends axially when positioned in the pockets 114. In other words, either a North or South pole faces axially toward the surface 106. The magnets 110 are inserted into the pockets 114 such that each magnet 110 alternates in polarity from the adjacent magnets 110 when viewed circumferentially about the end of the body portion 102. Thus, the magnets 110 are oriented and positioned in the pockets 114 such that an alternating pole/polarity arrangement of N-S-N-S-N-S, etc. is achieved adjacent the surface 106. The illustrated magnetic tool 94 includes fifty magnets 110, although the number of magnets 110 can be varied as desired. The magnets 110 should be arranged closely enough together to provide a continuous magnetic field to interact with the workpiece 22 being hardened.

The magnetic tool 94 can be used for hardening an end surface of the workpiece 22, or in other words, a surface of the workpiece that is generally perpendicular to the axis of rotation of the magnetic tool 94. The discussions above regarding the alternative magnet configurations that can be used, the relationship between frequency, poles, and rotational speed, the variables such as ramp time, soak time, and air gap, and the concentricity between the mounting shaft and the magnets apply equally to the magnetic tool 94 and to the other magnetic tool configurations discussed below.

Figure 9:
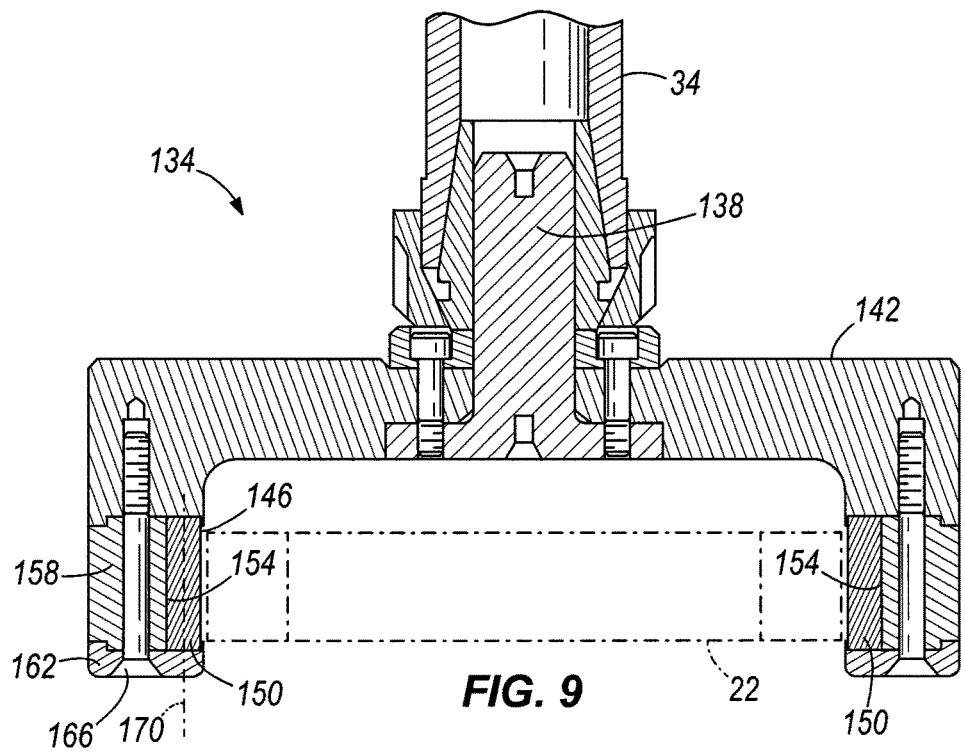
FIG. 9 is a cross-sectional view of yet another magnetic tool that can be used with the apparatus for magnetic induction hardening shown in FIG. 1.
Figure 10:
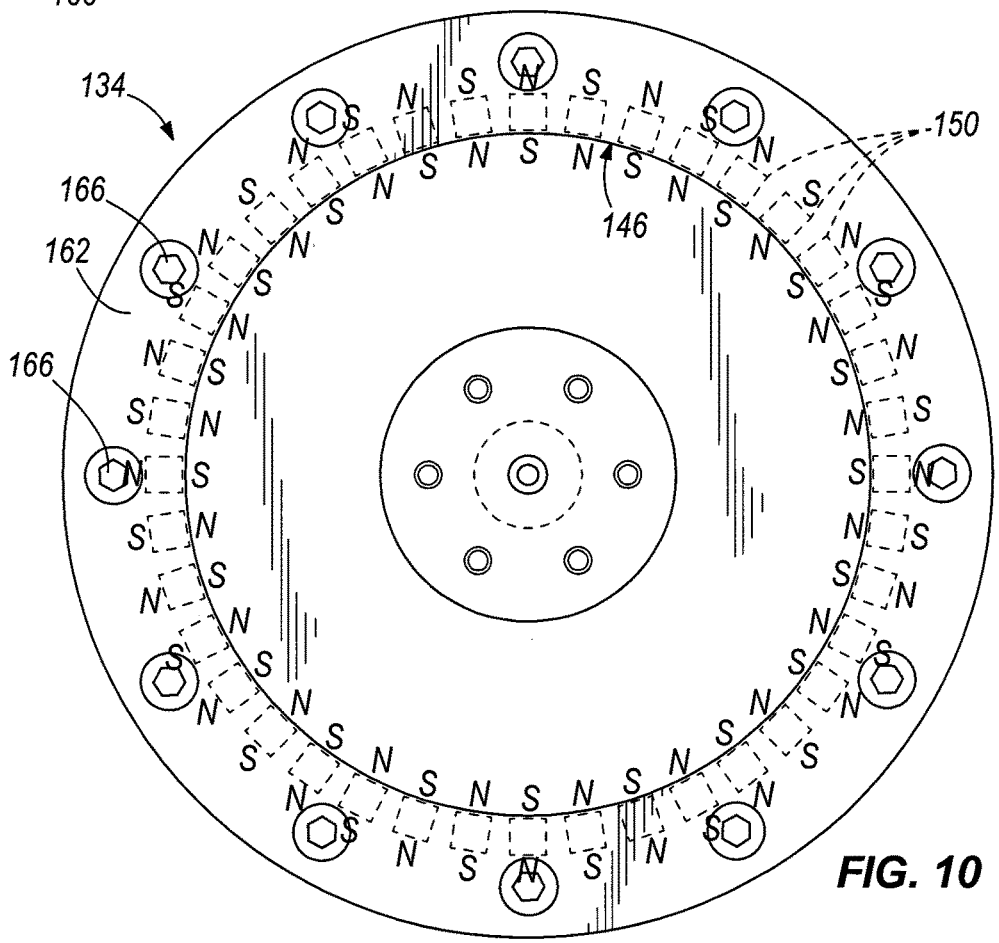
FIG. 10 is an end view of the magnetic tool of FIG. 9.

FIGS. 9 and 10 illustrate another magnetic tool 134 that could be used with the apparatus 10. Like the magnetic tools 14 and 94, the tool 134 includes a mounting portion 138 in the form of a drive shaft, and a body portion 142 coupled to the mounting portion 138. The mounting portion 138 can be releasably secured to the spindle 34, which is coupled to the drive unit 26 for rotation therewith (see FIG. 1). The mounting portion 138 and the body portion 142 are each formed of a generally non-magnetic material or a material deemed to have a low relative permeability, such as aluminum or austenitic stainless steel. The body portion 142 defines a surface 146 configured to be positioned in close proximity to a workpiece 22. As best illustrated in FIGS. 9 and 10, the illustrated body surface 146 is a radially inwardly-facing circumferential surface of the body portion 142 that is configured to correspond to a radially outward surface of an annular (or cylindrical) workpiece 22. Of course, with workpieces of differing geometries, the geometry of the surface 146 can be adjusted accordingly to achieve the desired hardening results.

The magnetic tool 134 includes a magnetic arrangement that, in this embodiment, takes the form of a plurality of permanent magnets 150 coupled to the body portion 142 at or adjacent the surface 146. In the embodiment illustrated in FIGS. 9 and 10, the plurality of permanent magnets 150 are housed in respective pockets 154 defined or formed in the body portion 142 to form part of the surface 146, and such that no thin wall portion is defined between the surface 146 and each of the plurality of pockets 154. As such, the magnets 150 are coupled to the body portion 142 via their placement in the pockets 154 at a location adjacent the surface 146. The pockets 154 are defined in part by a ring portion 158 of the body portion 142, and by a cover 162 coupled to and forming part of the body portion 142 with fasteners 166. Should the magnets 150 become damaged or degrade from normal usage, the cover 162 can be removed to facilitate replacement of the magnets 150. In other embodiments, the pockets 154 can be formed in different manners. For example, the pockets 154 could be formed in a similar fashion to the pockets 66 described above.

The magnets 150 are inserted into the pockets 154 with a tight fit such that the magnets 150 will not substantially move around within the pockets 154. If the magnets 150 were allowed to move around substantially within the pockets 154, the balance of the magnetic tool 134 could be adversely affected.

In the illustrated embodiments, the cross-section of the magnets 150 as well as the pockets 154 is substantially square in shape, but other cross-sectional shapes (e.g., circular, trapezoidal—see FIG. 4a, etc.) could be substituted. The pockets 154 and therefore the inserted magnets 150 have a longitudinal axis 170 (see FIG. 9) that extends generally parallel to the surface 146. As best represented in FIG. 10, the poles of the magnets 150 (e.g., North-N and South-S poles) are on two opposing elongated faces of the magnets 150 such that their N-S axis extends radially when positioned in the pockets 154. In other words, either a North or South pole faces radially toward the surface 146. The magnets 150 are inserted into the pockets 154 such that each magnet 150 alternates in polarity from the adjacent magnets 150 about the circumference of surface 146 of the body portion 142. Thus, the magnets 150 are oriented and positioned in the pockets 154 such that an alternating pole/polarity arrangement of N-S-N-S-N-S, etc. is achieved adjacent the surface 146. The illustrated magnetic tool 134 includes forty magnets 150, although the number of magnets 150 can be varied as desired. The magnets 150 should be arranged closely enough together to provide a continuous magnetic field to interact with the workpiece 22 being hardened. The magnetic tool 134 can be used for hardening a radially outwardly-facing surface of the annular workpiece 22.

Figure 11:
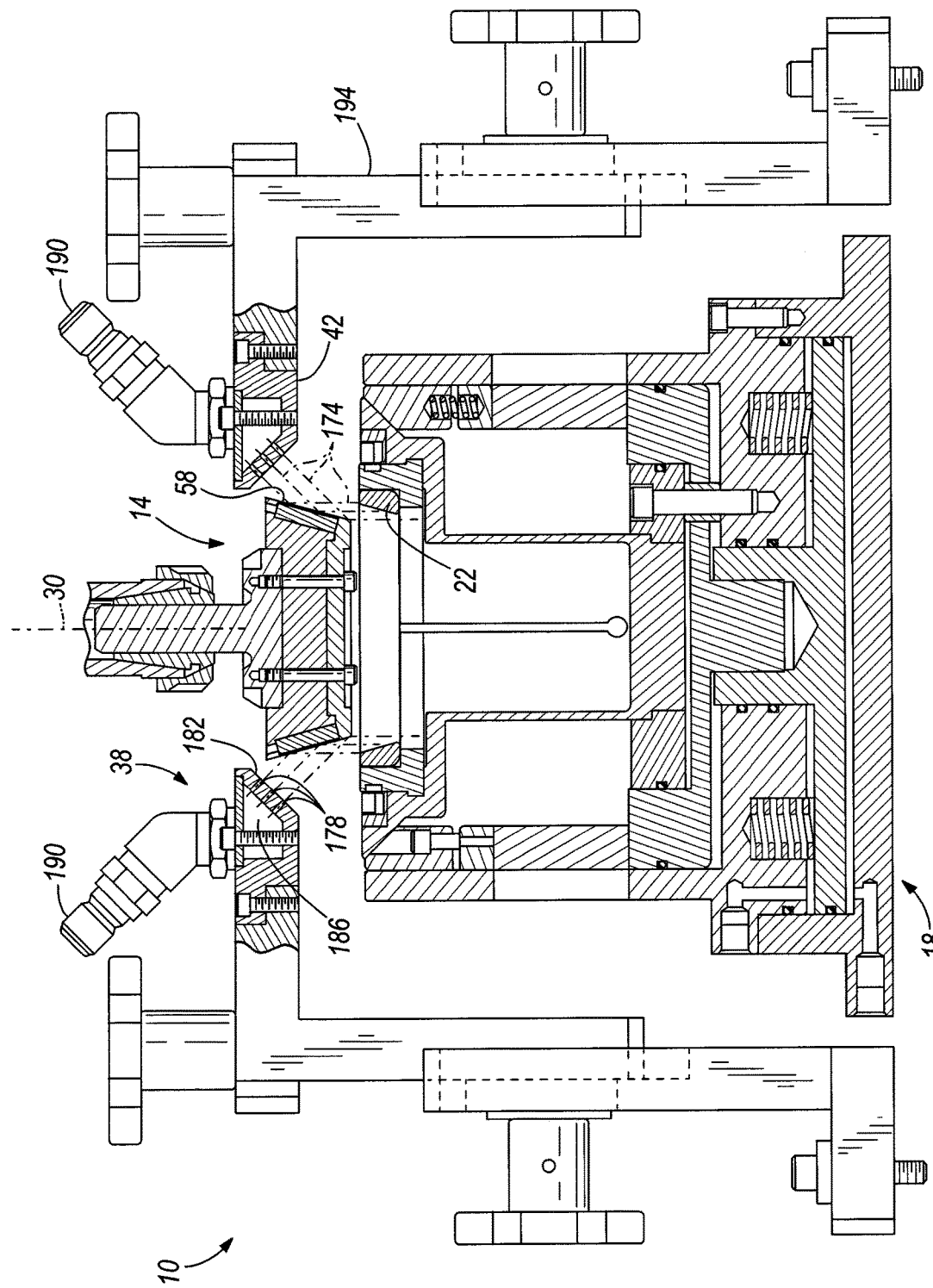
FIG. 11 is a partial section view of FIG. 1 showing the quenching system embodying the invention.

FIG. 11 is a section view of the apparatus 10 shown with the magnetic tool 14 moved axially away from (i.e., lifted upwardly as shown in FIG. 11) its heating position relative to the workpiece holder 18 to allow the workpiece 22 to be quenched by the quenching system 38. In other words, the magnetic tool 14 and the workpiece holder 18 are movable relative to one another in a direction parallel to the axis of rotation 30 between a first position for heating the workpiece 22 (see FIG. 2) and a second position for quenching the workpiece 22 (see FIG. 11). The quench collar 42 surrounds the workpiece 22 as shown in FIG. 11 for showering the workpiece 22 with the quenching medium 174 (see FIG. 11). As shown in FIGS. 1 and 11, the quench collar 42 includes a plurality of apertures 178 formed in an angled wall 182 and that communicate with a chamber 186 (see FIG. 11) that is supplied with the quenching medium 174. Connectors 190 are fluidly connected to supply lines (not shown) that selectively supply the quenching medium 174 to the chamber 186.

As best shown in FIG. 11, the quenching medium 174 is directed through the apertures 178 toward the surface 58 of the magnetic tool 14 and is deflected downwardly onto the workpiece 22, thereby showering the workpiece 22 with the quenching medium 174. The second or quenching position of the magnetic tool 14 can be adjusted as desired to achieve the appropriate showering effect. The quench collar 42 is supported in position above the workpiece holder 18 by a support structure 194. It is to be understood that different quench collar and support arrangements can be substituted for those shown in the figures.

Figure 12:
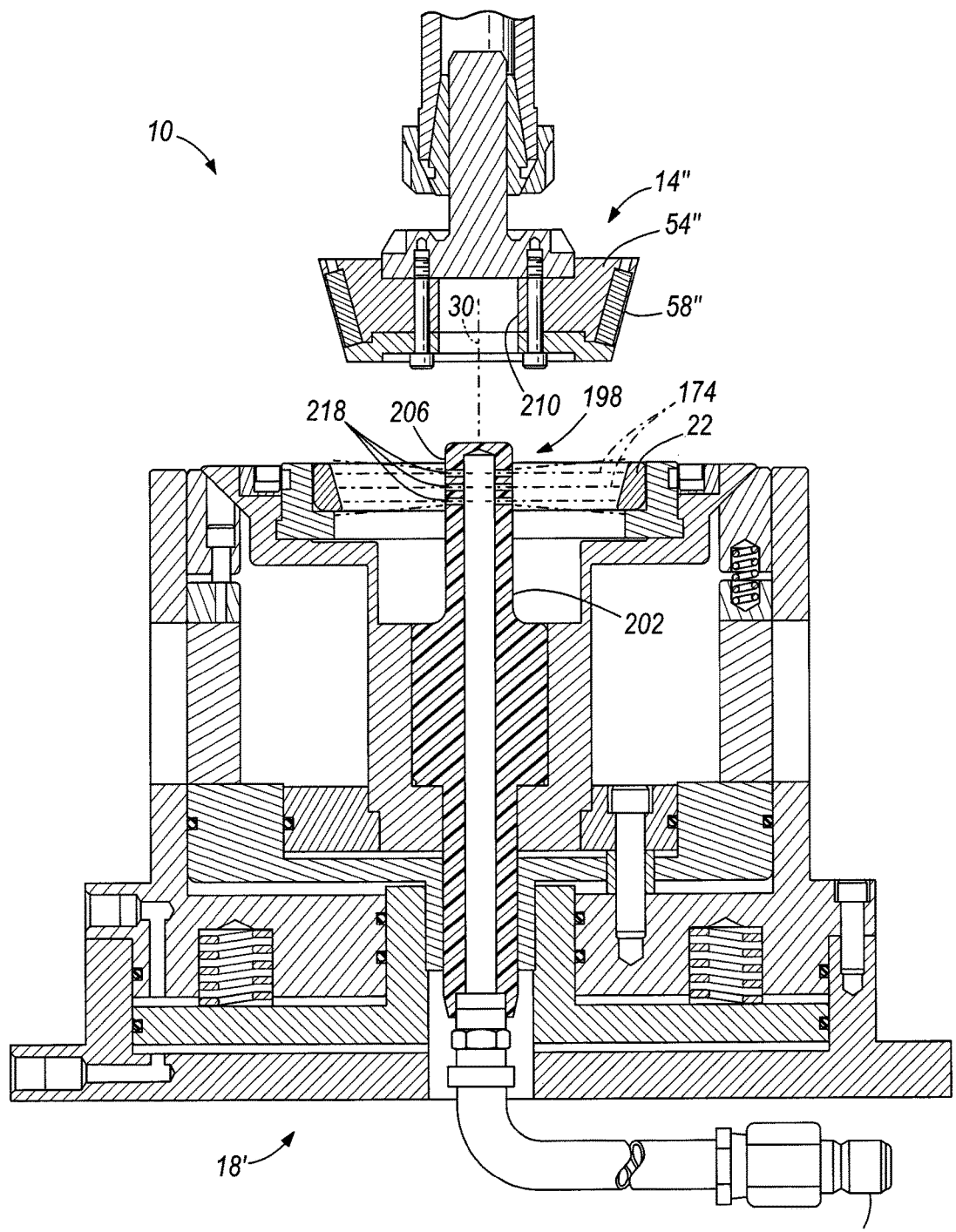
FIG. 12 is a partial section similar to FIG. 11 showing an alternate quenching system embodying the invention.

FIG. 12 illustrates an alternative quenching system 198 that can be used with the apparatus 10. In the quenching system 198, a conduit 202 is coupled to and extends from within the workpiece holder 18' such that a distal end 206 of the conduit 202 is positioned at least partially within the workpiece 22 when the workpiece 22 is supported by the workpiece holder 18'. As shown in FIG. 12, the magnetic tool 14" is modified slightly from the magnetic tool 14 to include an aperture or recess 210 in the body portion 54" sized and configured to receive at least a portion of the distal end 206 of the conduit 202 when the magnetic tool 14" is in the first position for heating the workpiece 22 (i.e., when the surface 58" is positioned in close proximity to the workpiece 22). FIG. 12 illustrates the magnetic tool 14" in the second position for quenching the workpiece 22. Quenching medium 174 flows through the conduit 202 from a supply coupled to a connector 214, and exits the conduit 202 through apertures 218 formed in the distal end 206. The apertures 218 extend circumferentially around the distal end 206 to spray the quenching medium 174 a complete 360 degrees around the distal end 206 and onto the workpiece 22. With the arrangement shown in FIG. 12, the quenching system 198 is integrated with the workpiece holder 18'.

FIG. 13 illustrates yet another alternative quenching system 222 which is integrated with the magnetic tool 14'''. The mounting portion 50''' and body portion 54''' of the magnetic tool 14''' together define a conduit 226 through which the quenching medium 174 can be supplied. The supply of quenching medium 174 can be provided through the spindle (not shown). As shown in FIG. 13, the cover 78''' is modified to include an extension or protrusion 230 extending axially away from the mounting portion 50''' and that includes radially-oriented, circumferentially positioned apertures 234 communicating with the conduit 226 to permit the quenching medium 174 in the conduit 226 to be sprayed onto the workpiece 22 when the magnetic tool 14''' is raised to the second, quenching position. If the number and positioning of the apertures 234 are sufficient, the quenching can occur without rotating the magnetic tool 14''', however, in other embodiments, the magnetic tool 14''' can be slowly rotated during the quenching stage to better distribute the quenching medium 174.

FIG. 14 illustrates yet another alternative quenching system 238 that is integrated with the magnetic tool 14''''. The mounting portion 50'''' and body portion 54'''' of the magnetic tool 14'''' together define a conduit 242 through which the quenching medium 174 can be supplied. Apertures 246 extend through the body portion 54'''' from the conduit 242, radially outwardly to the surface 58'''', and are positioned between adjacent magnets 62''''. With this configuration, the magnetic tool 14'''' need not be raised from the first, heating position in order to achieve quenching. Instead, once the heating operation is completed, the rotation of the magnetic tool 14'''' can be slowed or stopped and the quenching medium 174 can be supplied to the conduit 242 to quench the workpiece 22 without raising the magnetic tool 14''''.

Figure 15:
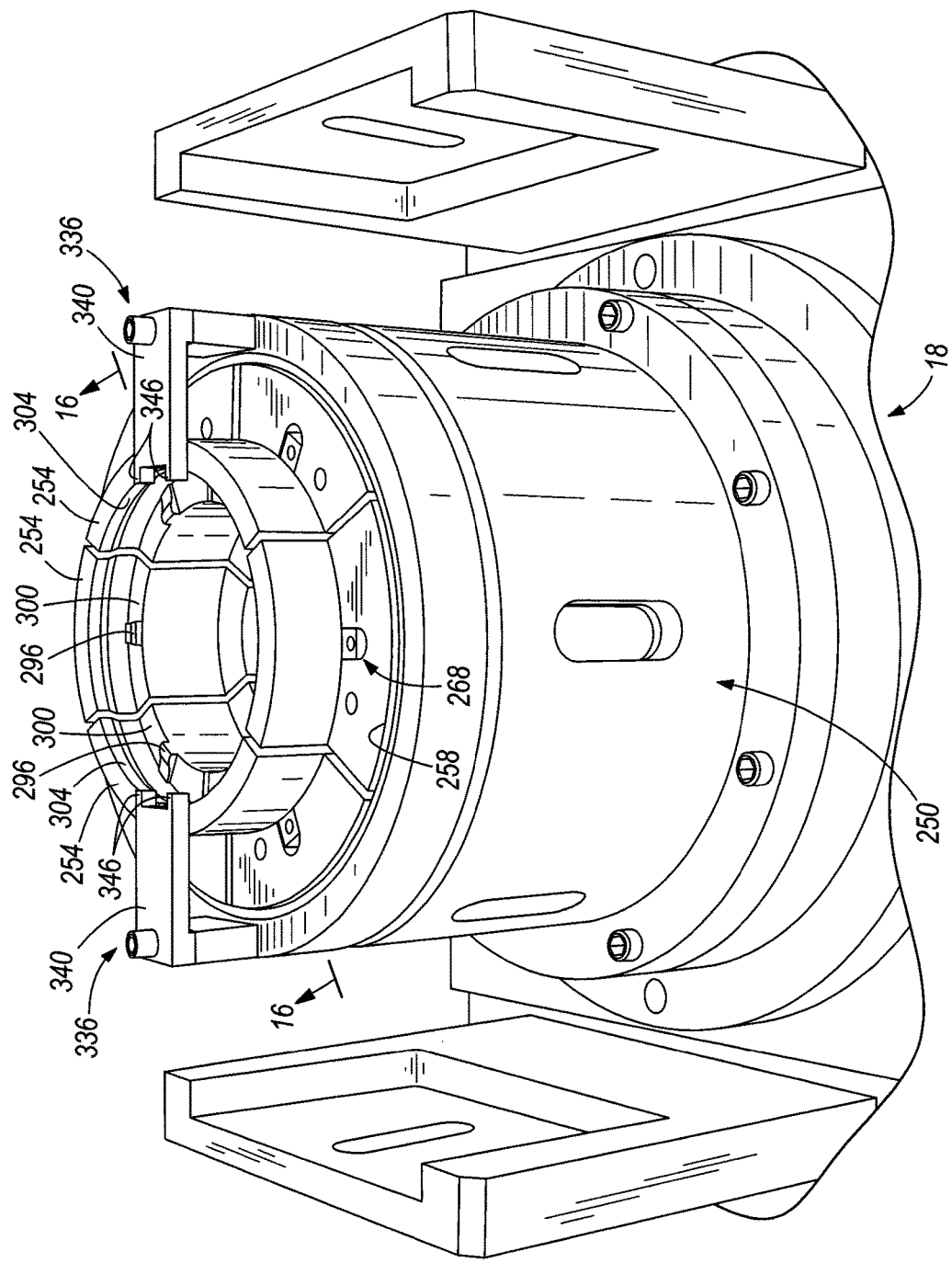
FIG. 15 is an enlarged perspective view of the workpiece holder of FIG. 1.

FIG. 15 illustrates the workpiece holder 18 and is shown with the quench collar 42 and the workpiece 22 removed for clarity. The workpiece holder 18 includes a pneumatic or air chuck 250 designed to securely support the workpiece 22 with clamping forces sufficient to prevent both rotation and translation of the workpiece 22 relative to the axis of rotation 30. Due to the magnetic attraction between the magnetic tool 14 and the workpiece 22, it is important that the workpiece 22 be sufficiently clamped to prevent rotation and translation relative to the axis of rotation 30. The air chuck 250 operates using air pressure to radially clamp the workpiece 22 via engagement with a plurality of collet pads 254. As shown in FIG. 15, six collet pads 254 are provided on the workpiece holder 18 to circumferentially surround and support the workpiece 22. In other embodiments, the number of collet pads 254 can vary as desired.

Figure 16:
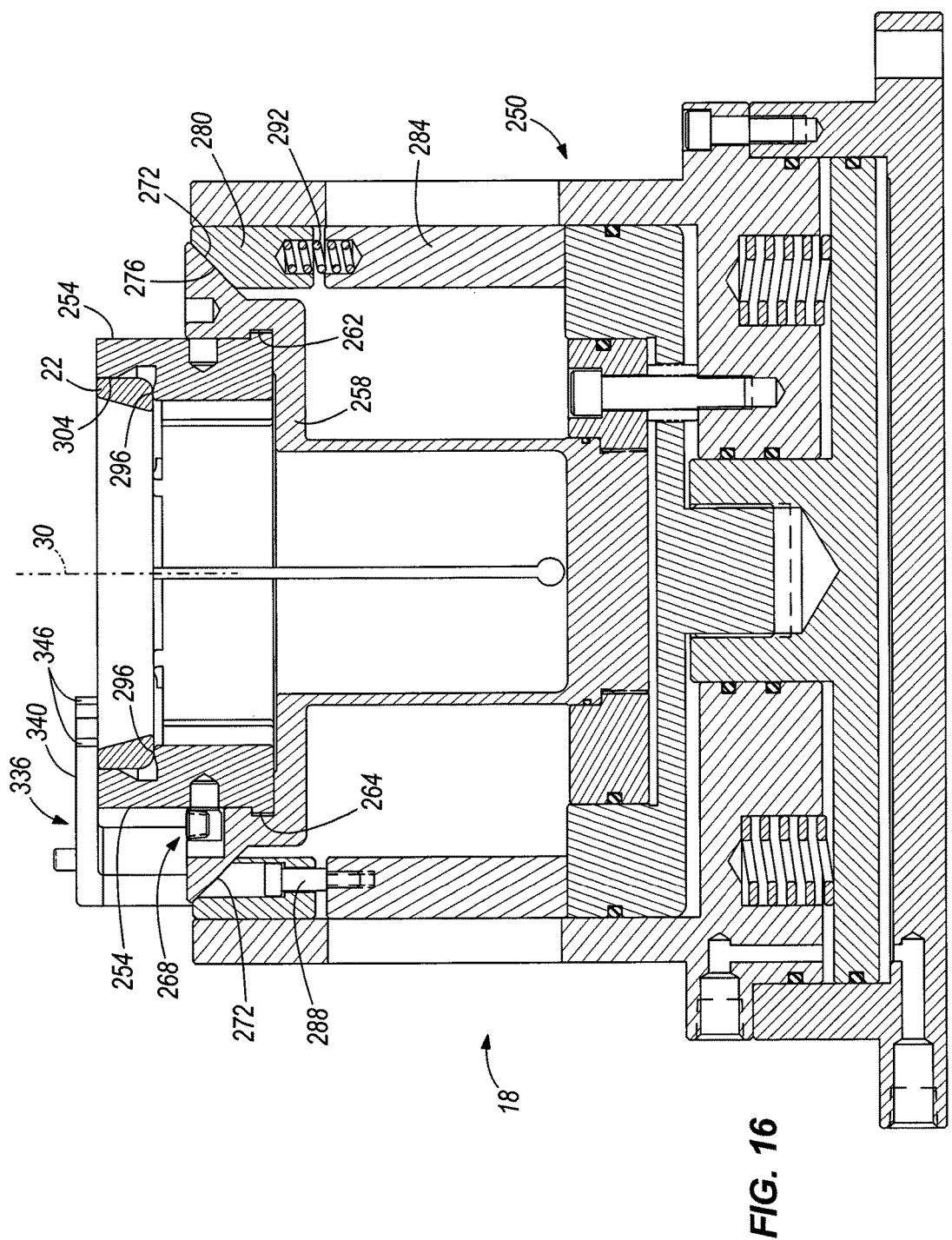
FIG. 16 is section view of the workpiece holder of FIG. 15.

Referring now to both FIGS. 15 and 16, the pads 254 are supported by a pad support member 258 having a circumferential groove 262 (see FIG. 16) configured to receive a circumferential lip 264 (see FIG. 16) formed on each pad 254. A fastening arrangement 268 is provided to further secure each pad 254 to the pad support member 258. As shown in FIG. 16, the pad support member 258 includes cam surfaces 272 that engage mating cam surfaces 276 of an upper support member 280. The upper support member 280 is coupled to a lower support member 284 via fasteners 288 and via a plurality of compression springs 292 (only one is shown) to allow some slight relative vertical movement between the upper support member 280 and the lower support member 284, even when the pneumatic clamping force is applied to the air chuck 250 to bias the pads 254 in the radially inward clamping or securing direction to clamp the workpiece 22. By providing the compression springs 292, and by virtue of the cam surfaces 272 and 276, the air chuck 250 is allowed to compensate for thermal expansion of the workpiece 22 during the hardening process by allowing the pads 254 to expand radially outwardly against the clamping bias during the thermal growth of the workpiece 22. This helps minimize or eliminate any warping or distortion of the workpiece 22 during the hardening operation.

Still referring to FIGS. 15 and 16, the radial clamping by the pads 254 substantially prevents rotation of the workpiece about the axis of rotation 30. The pads 254 each include a projection 296 projecting upwardly from a generally horizontal surface 300 of the pad 254. The lower surface of the workpiece 22 rests on each of the projections 296 so that a point or small-area contact is achieved. The pads 254 each also include a generally vertical surface 304 against which the radially outer surface or diameter of the workpiece 22 abuts. This workpiece supporting arrangement by each pad 254 is most clearly shown in FIG. 16. The pads 254 are made of para-magnetic materials, such as aluminum or stainless steel, and can be further configured such that the engagement between each pad 254 and the workpiece 22 occurs at locations on the pad 254 that are electrically non-conductive. In the embodiment illustrated in FIGS. 15 and 16, each of the projections 296 and the vertical surfaces 304 are coated with a non-conductive material, such as Teflon, ceramics, etc., such that the workpiece holder 18 electrically isolates the workpiece 22 from ground.

FIG. 17 illustrates an alternative embodiment of a collet pad 308 that can be used with the workpiece holder 18. Instead of the projections 296, each pad includes a non-conductive insert or attachment 312 coupled (e.g., via a fastener 316) to the radially inner surface of the pad 308 such that a portion of the insert 312 extends vertically above one or more horizontal surfaces 320 defined by the pad 308. The bottom of the workpiece 22 will rest on and be supported by the insert 312 above the horizontal surfaces 320. While the illustrated insert 312 is shown as being a substantially diamond-shaped ceramic part, other non-conductive materials and configurations can also be used.

Additionally, the pad 308 includes a plurality of further non-conductive inserts or attachments 324 sized and configured to engage and support the outer surface or diameter of the workpiece 22. As shown in FIG. 17, the pad 308 includes a generally vertical surface 328 that terminates at a distal upper surface 332 of the pad 308. Three non-conductive inserts 324 are coupled to the upper surface 332 so as to extend radially inwardly beyond the generally vertical surface 328. Substantially line contact will occur between each insert 324 and the outer surface of the workpiece 22, and the outer surface of the workpiece 22 will not contact the generally vertical surface 328. In the embodiment illustrated in FIG. 17, the inserts 324 are ceramic cylinders. In different embodiments, other non-conductive materials and configurations can be used. Together, the inserts 312 and 324 support the workpiece 22 such that the workpiece holder 18 electrically isolates the workpiece 22 from ground.

Referring once again to FIGS. 15 and 16, the workpiece holder 18 further includes one or more clamps 336 operable to secure the workpiece 22 to help prevent translation of the workpiece 22 (e.g., upwardly) along the axis of rotation 30 when the workpiece is supported by the pads 254, 308. The illustrated clamps 336 are connected to the air chuck 250 along an outer periphery and include clamp members 340 that extend radially inwardly toward the axis of rotation 30, over the upper end of the pads 245, 308, and over the upper end surface of the workpiece 22 (see FIG. 16). The clamp members 340 engage the workpiece 22 at a location on the clamp members 340 that is non-conductive, again so as to electrically isolate the workpiece 22 from ground. In the illustrated embodiment, the clamps 336 (including the clamp members 340) are made of a non-conductive ceramic material. In other embodiments, para-magnetic material could be used and a non-conductive coating could be applied to the end of the clamp members 340 that engages the workpiece 22. The illustrated clamp members 340 each include two spaced-apart distal end projections 346 that engage the workpiece 22, while the remainder of each clamp member 340 does not engage the workpiece, and does not interfere with the magnetic tool 14. It is to be understood that other configurations of the clamps 336 can also be used. Furthermore, more than two clamps 336 can be used if desired.

The illustrated workpiece holder 18 is just one example of a workpiece holder that can be used with the apparatus 10. For example, a conventional three jaw chuck can be used to hold the workpiece 22. However, it has been found that the workpiece holder 18 described above is well-suited for preventing rotation and translation of the workpiece 22, helps to prevent distortion of some workpieces 22 during heating, and is advantageous in its ability to electrically isolate the workpiece 22 from ground.

As described above, the workpiece holder 18 can be designed to accommodate thermal expansion or growth of the workpiece 22. Depending upon the amount of thermal expansion a particular workpiece 22 may undergo during heating for hardening, it may be desirable to also adjust the air gap G between the surface 58 of the magnetic tool 14 and the adjacent surface of the workpiece 22 to achieve the desired hardening characteristics, such as the case depth. FIG. 18 illustrates one possible magnetic arrangement designed to accommodate thermal expansion of the workpiece 22 and that can be used in any of the magnetic tools discussed above (shown in a magnetic tool similar to the magnetic tool 134 of FIG. 9). Specifically, the magnets 62 can each be formed by a stacked set (e.g., a pair) of magnets having a first or upper magnet 62a and a second or lower magnet 62b radially offset from the first magnet 62a. In other words, for an entire circular array of magnets 62, the array of upper magnets 62a can be said to define a first magnetic diameter at a first axial location that is different from (e.g., smaller than) a second magnetic diameter defined by the array of lower magnets 62b at a second axial location. In order to keep the gap G substantially constant, the workpiece 22 can start in the upper position relative to the magnetic tool 14 (shown in solid lines in FIG. 18) so that the workpiece 22 is adjacent the array of upper magnets 62a. As the diameter of the workpiece 22 grows due to thermal expansion, the magnetic tool 14 can be moved (e.g., raised)

relative to the workpiece 22 so that the workpiece 22 (shown in phantom lines in FIG. 18) is adjacent the array of lower magnets 62b. The radial offset between the arrays of magnets 62a and 62b is substantially the same as the expected radial growth of the workpiece 22 so that consistent hardening can be achieved.

FIG. 19 illustrates an alternative magnetic arrangement similar in principle to the magnet arrangement shown in FIG. 18 for accommodating thermal expansion of the workpiece 22. Instead of having stacked sets of individual magnets, the magnets 62 can be shaped or formed as shown to have an upper portion that defines a first magnetic diameter at a first axial location that is different from (e.g., smaller than) a second magnetic diameter defined by the lower portion of the magnet 62 at a second axial location.

FIG. 20 schematically illustrates another alternative magnetic arrangement designed to accommodate thermal expansion of the workpiece 22. Each of the magnets 62 is mounted so as to be movable in the radial direction to vary a magnetic diameter defined by the array of magnets 62. In the illustrated embodiment, each magnet 62 is curved or shaped and is coupled to a movable (e.g., pivoting) arm 350. The arm 350 pivots about pivot point 352 and engages a cam surface 354 (e.g., a conical surface) that can be adjusted in the direction of the axis 30 relative to the arm 350 to cause the desired radial movement of the magnets 62 to maintain or achieve the desired gap G as the workpiece 22 expands.

Figure 21:
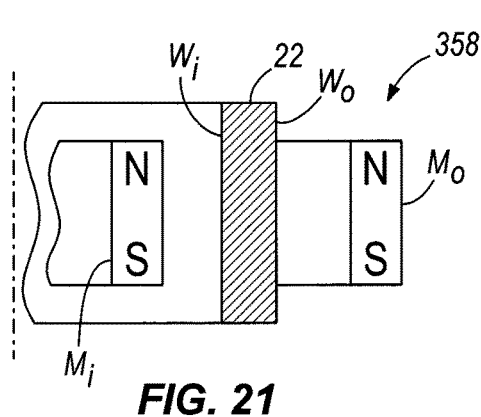
FIG. 21 is a schematic view of a further embodiment of a magnetic tool for through hardening.

FIG. 21 schematically illustrates another arrangement of a magnetic tool 358, which includes an inner ring or array of magnets $M_i$ that defines a first, radially inner surface portion of the body of the magnetic tool 358, and an outer ring or array of magnets $M_o$ that defines a second, radially outer surface portion of the body of the magnetic tool 358. The inner and outer rings of magnets $M_i$ and $M_o$ have alternating poles as described above. The inner ring of magnets $M_i$ is in close proximity to an inner surface $W_i$ of the annularly-shaped workpiece 22 while the outer ring of magnets $M_o$ is in close proximity to the outer surface $W_o$ of the workpiece 22. The inner and outer rings of magnets $M_i$ and $M_o$ are rotated relative to the workpiece 22 such that each ring of magnets heats one half the annular width of the workpiece 22, such that the workpiece 22 will be through hardened (as indicated by the complete section line portion of the workpiece 22 in FIG. 21). To compensate for the fact that the workpiece outer surface $W_o$ is longer than the workpiece inner surface Wi, the inner and outer rings of magnets $M_i$ and $M_o$ can be rotated at different rates, can have different numbers of poles, can be ramped up to the desired RPM at different rates, and/or can be operated at the desired RPM for different periods of time. Additionally or alternatively, the air gaps G can be changed.

Figure 22:
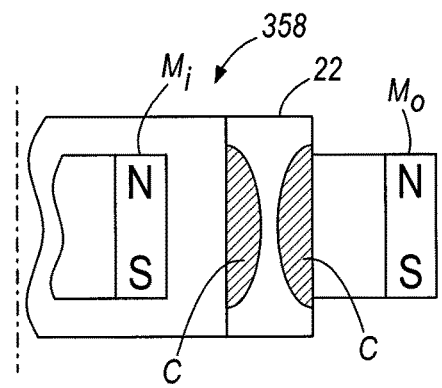
FIG. 22 is a schematic view similar to FIG. 21, but shows heat treating two surfaces of a workpiece without through hardening.

FIG. 22 schematically shows the use of the magnetic tool 358 in a non-through hardening application. The magnets $M_i$ and $M_o$ are sized (i.e., have a magnetic field), or the magnetic tool 358 is operated such that a hardened case C is formed on the inner and outer workpiece surfaces $W_i$ and $W_o$ without through hardening the workpiece 22. This will result in a more ductile interior of the workpiece 22.

Figure 23A:
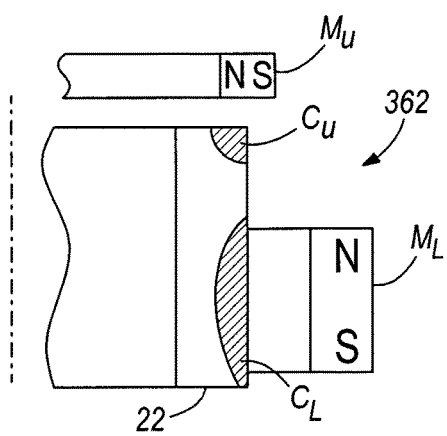
FIGS. 23a and 23b are schematic views showing hardening of disparate sections of a workpiece surface.

The magnets of the magnetic tool can also be arranged to harden selected (and potentially separate) areas of the workpiece 22, to form a case C of varying depth, or to form a case on a workpiece 22 having a more complex geometric shape (i.e., not generally cylindrical). FIG. 23a schematically represents a magnetic tool 362 having a lower ring of magnets $M_L$ positioned adjacent a lower portion of the workpiece 22 and an upper ring of magnets $M_U$ positioned adjacent an upper corner of the workpiece 22. This configuration will produce a lower hardened case $C_L$ and an upper hardened case $C_U$ with an area between that is not case hardened.

Figure 23B:
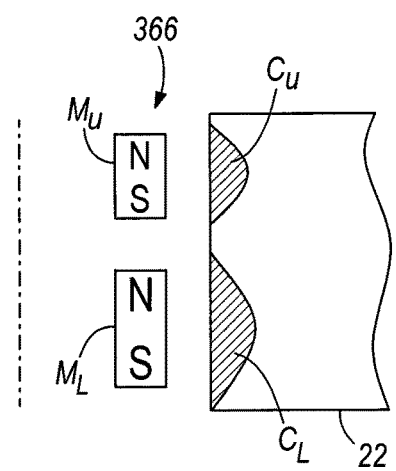

FIG. 23b schematically illustrates another magnetic tool 366 having upper and lower magnet rings $M_U$ and $M_L$ that are sized and configured to achieve a desired case hardening of the workpiece 22. The lower case hardened area $C_L$ is longer than the upper case hardened area $C_U$. This is achieved by using a lower magnet ring $M_L$ that having an effective axial length that is longer than the effective axial length of the upper magnet ring $M_U$. This can be achieved by using longer magnets on the lower magnet ring $M_L$, or by stacking magnets to produce a lower magnet ring $M_L$ with a longer effective length.

Figure 24A:
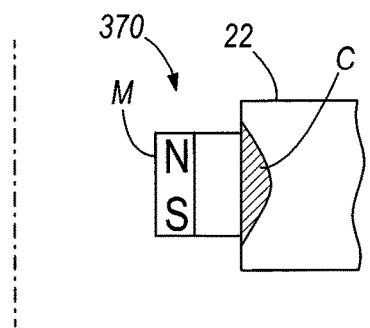
FIGS. 24a and 24b are schematic views showing the effect of magnet length on the length of the case produces on a workpiece surface.

FIG. 24a schematically illustrates a magnetic tool 370 with a magnet ring M having an axial length smaller than the axial length of the workpiece 22. As shown, the magnet ring M is expected to produce a hardened case C that does not extend the full axial length of the workpiece 22, leaving unhardened areas of the surface above and/or below the surface area that is case hardened.

Figure 24B:
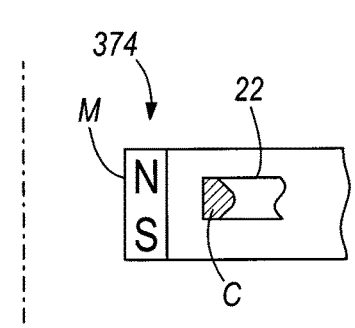

FIG. 24b shows the opposite situation from FIG. 24a. The schematically illustrated magnetic tool 374 has a magnet ring M with an axial length that is larger than the axial length of the workpiece 22. As shown in FIG. 24b, this arrangement is expected to produce a hardened case C that extends the full axial length of the workpiece 22.

Figure 25:
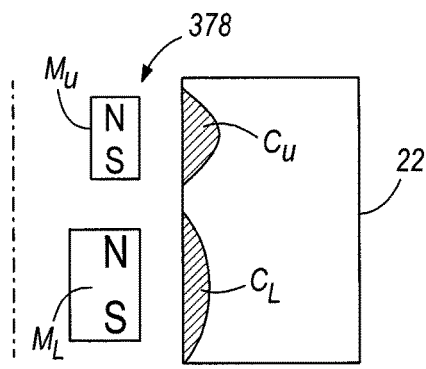
FIG. 25 is a schematic view showing the expected effect of magnet width on case depth.

FIG. 25 schematically illustrates a magnetic tool 378 in which the lower magnet ring $M_L$ has an annular width that is greater than the annular width of the upper magnet ring $M_U$. Varying the annular width of the magnet ring can be accomplished using wider magnets for the wider magnet ring, or by radially stacking magnets. As shown in FIG. 25, the wider magnet ring is expected to produce a thinner case depth $C_L$ than the thinner magnet ring when the two rings are ramped up at the same rate, rotated at the same desired speed, and provided with the same soak times.

Figure 26A:
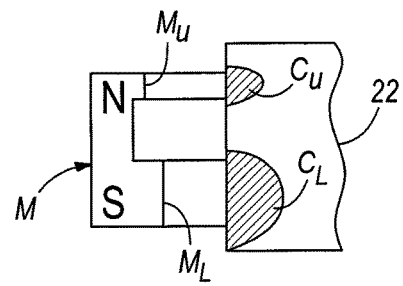
FIGS. 26a, 26b, and 26c are schematic views showing the expected effect of shaped magnets on the shape of the case produced.
Figure 26B:
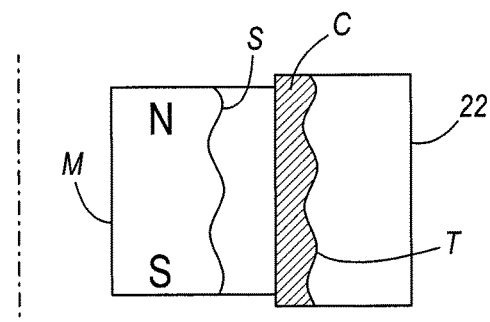
Figure 26C:
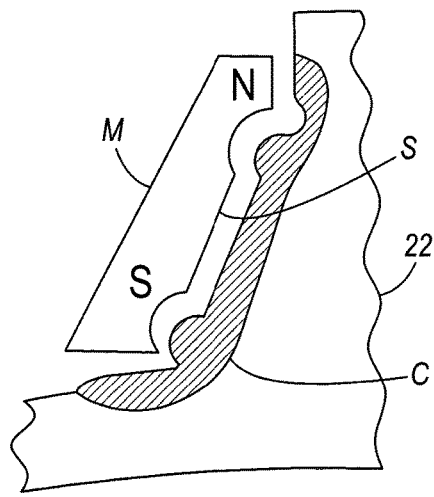

FIGS. 26a-c show the expected results from using shaped magnets M in the magnetic tools. In FIG. 26a, the magnet M is generally U-shaped, having an upper portion $M_U$ and a lower portion $M_L$ that are axially spaced from each other. The magnet upper portion $M_U$ is axially shorter and radially shorter than the lower magnet portion $M_L$. As seen, this magnet configuration is expected to produce a lower case $C_L$ that is axially longer and radially deeper than the upper case $C_U$.

In FIG. 26b, the magnet M has a surface S that is provided with a desired shape or profile. In a workpiece 22 with a flat surface facing the magnet surface S, the shape of the surface S is expected to produce a case C in which the transition T between the case and the core will generally correspond in shape or profile to the shape of the workpiece surface S.

As shown in FIG. 26c, shaped magnets M could also be used to case harden shaped surfaces of a workpiece 22. In this instance, the magnet surface S has a profile corresponding to the profile of the surface to be hardened. This will maintain a constant air gap between the magnet M and the workpiece surface, and should produce a hardened case C of a substantially constant depth from the workpiece surface.

Figure 27A:
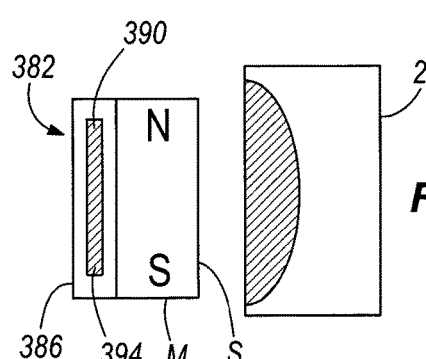
FIGS. 27a and 27b are schematic views showing potential systems for cooling the magnets.
Figure 27B:
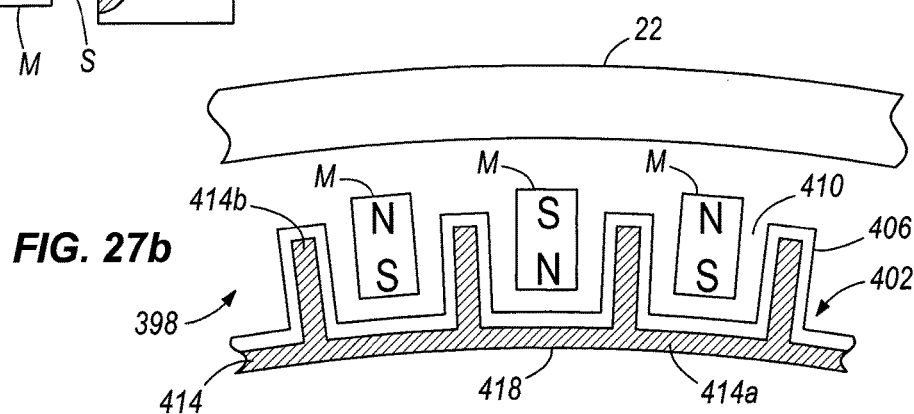

It is understood that the magnets used in the magnetic tools during the induction hardening operation will be heated up. If the magnets exceed their Curie temperature, they will lose their magnetic properties and the magnetic tool will no longer be effective. Therefore, in some applications, it may be useful to provide a cooling system for the magnets in the magnetic tool. FIGS. 27a and 27b schematically illustrate two possible cooling systems that could be incorporated with any of the magnetic tools described above. In FIG. 27a, the magnetic tool 382 includes a plurality of magnets M (only one is shown) having a surface S facing the workpiece 22 to be hardened. A wall 386, which can be integral with the body portion 54, defines an annular chamber 390 and is adjacent the ring of magnets M in heat transfer relation thereto (i.e., adjacent the surface opposite the surface S). The annular chamber 390 contains a coolant 394 that can be supplied and circulated by a suitable system. The wall 386 is made from a material, such as aluminum, that will readily transfer heat. The wall 386 and the coolant 394 will absorb the heat from the magnet M and conduct it away from the magnet M to maintain the magnet M below the Curie temperature.

FIG. 27b illustrates an alternative cooling system. In this system, the magnetic tool 398 includes a base 402, which can be integral with the body portion 54, comprising a plurality of spacers 406 defining pockets 410 that receive the magnets M. The base 402 includes a chamber 414 having a main portion 414a that passes behind the magnets M, and finger portions 414b that extend into the spacers 406. A coolant 418 is contained within the chamber 414 and is supplied and circulated by a suitable system. With this cooling system, the magnets M have three surfaces in heat transfer relationship with the base 402 and the coolant 418 to draw heat away from the magnets M.

While the magnetic tools 382 and 398 are both shown to have coolant-based cooling systems, the cooling system could alternatively or additionally comprise a solid heat sink made from a material having a high heat transfer coefficient, which includes other means, such as fins, to radiate heat away from the magnets.

Figure 28:
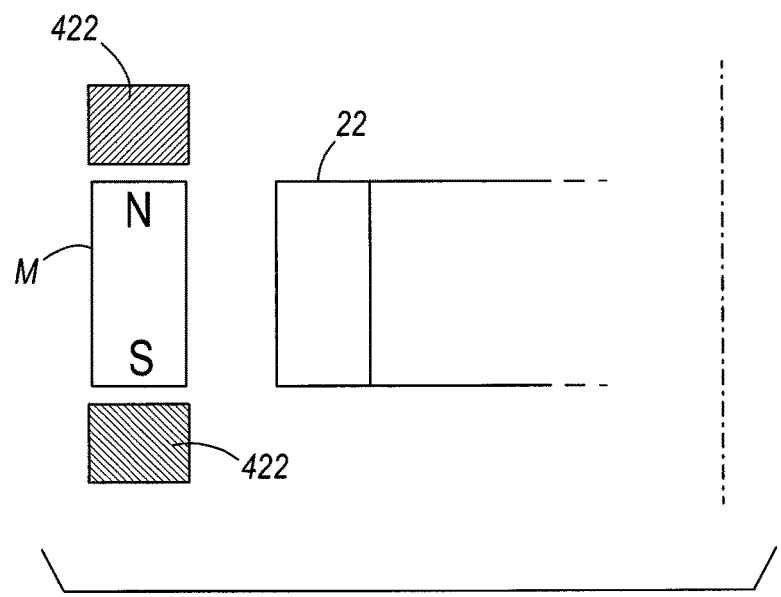
FIG. 28 is a schematic view showing the use of flux concentrators with the magnet.

FIG. 28 illustrates yet another modification that can be applied to any of the magnetic tools described above. Specifically, one or more flux concentrators 422 can be positioned about the magnets M in the magnetic tool to achieve the desired magnetic field enhancements, thereby achieving the desired hardening effects. The flux concentrators 422 can be made from various alloy steels, powdered metals, and the like. Additionally, coded magnets, i.e., magnets that are imprinted with a field that varies across the magnet's surface, can be used to vary or alter the magnetic field as desired.

Figure 29:
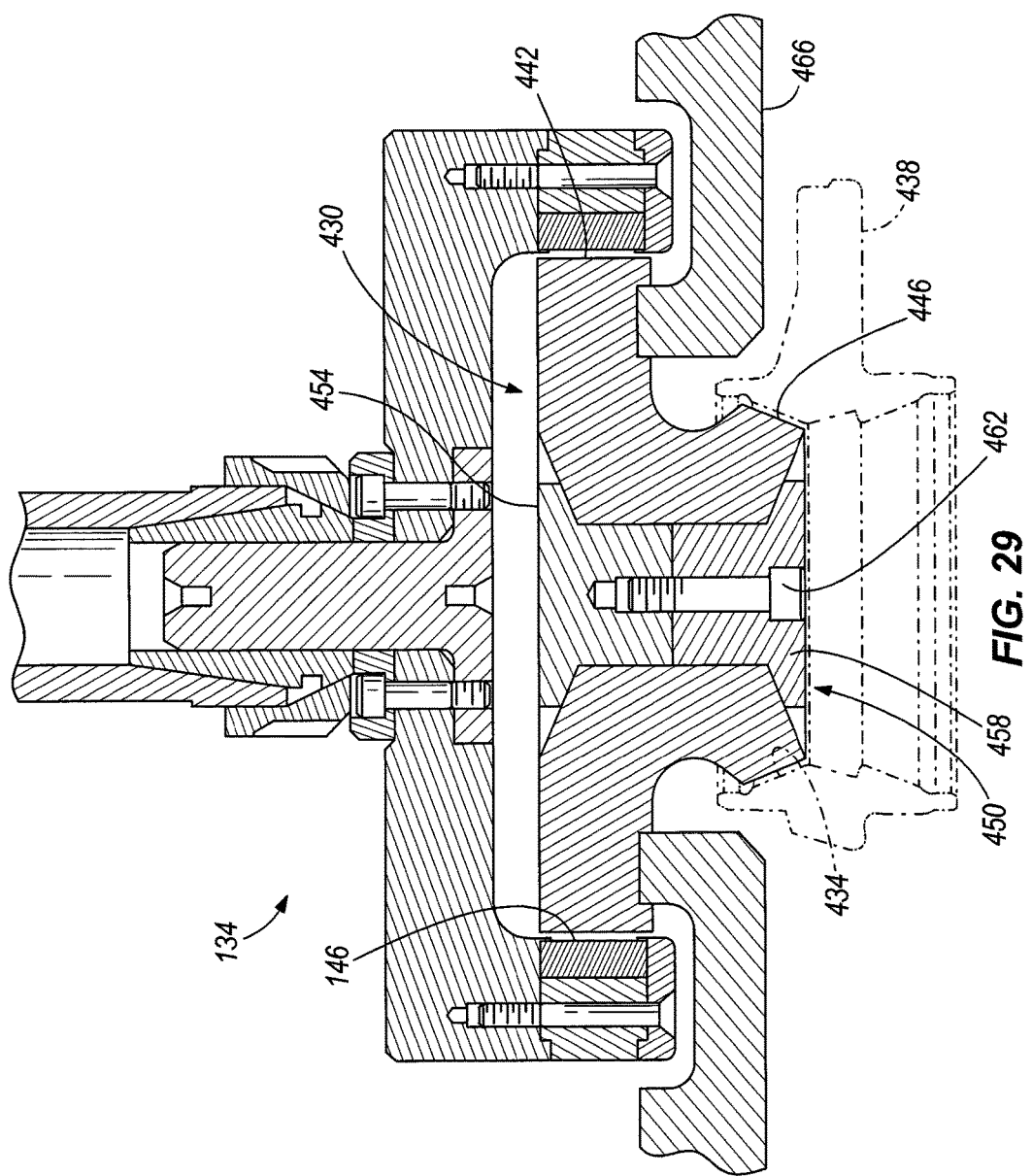
FIG. 29 is a partial cross-sectional view showing an eddy current conduit being used with a magnetic tool.

FIG. 29 illustrates the use of an eddy current conduit 430 that can be used with one or more of the magnetic tools described above. As shown in FIG. 29, the magnetic tool 134 is used in conjunction with the eddy current conduit 430 to channel or conduct eddy current from the surface 146, through the eddy current conduit 430, and to a surface 434 of a workpiece 438. Due to the small diameter defined by the surface 434, it may not be practical or possible to configure a magnetic tool to fit within the small diameter opening to be hardened. The number of poles that can be positioned in the small space may be so limited that the rotational rate required to achieve the needed frequency is higher than can be achieved by the apparatus 10. In such cases, an eddy current conduit, such as the conduit 430, can be designed for a particular application.

The illustrated eddy current conduit 430 is formed as a lamination of silicon steel. The eddy currents created by the rotating tool 134 are received by the conduit 430, which in turn induces the eddy currents into the surface 434 of the workpiece 438. The silicon steel laminations can be machined or formed to accommodate the particular magnetic tool and the particular workpiece. The surface 442 of the conduit 430 is formed to match the contour of the surface 146 with the desired air gap G, while the surface 446 of the conduit 430 is formed to match the contour of the surface 434 with the desired air gap G. The same principles described above with respect FIGS. 18, 19, and 21-26 for the particular configurations of the magnetic arrangement can be applied to the formation of the surface 446 of the conduit 430.

The individual sheet steel laminations of the conduit 430 are captured and held together by a clamping arrangement 450 that is centrally located within the conduit 430. Upper and lower clamp members 454 and 458, respectively, are held together by one or more fasteners 462. The conduit 430 is supported by a fixing support 466 that can be secured to the workpiece holder 18 in any suitable manner. In the illustrated embodiment, the fixing support 466, the conduit 430, the workpiece holder 18 and the workpiece 438 are all stationary while the magnetic tool 134 rotates. In other embodiments, the relative rotation between the magnetic tool 134 and the workpiece 438 could be achieved by rotating the workpiece holder 18, the fixing support 466 and the conduit 430.

The conduit 430 can be cooled by a cooling system if necessary. Coolant can be circulated between the individual laminations to remove heat from the laminations, as would be understood by one of ordinary skill in the art.

Figure 30:
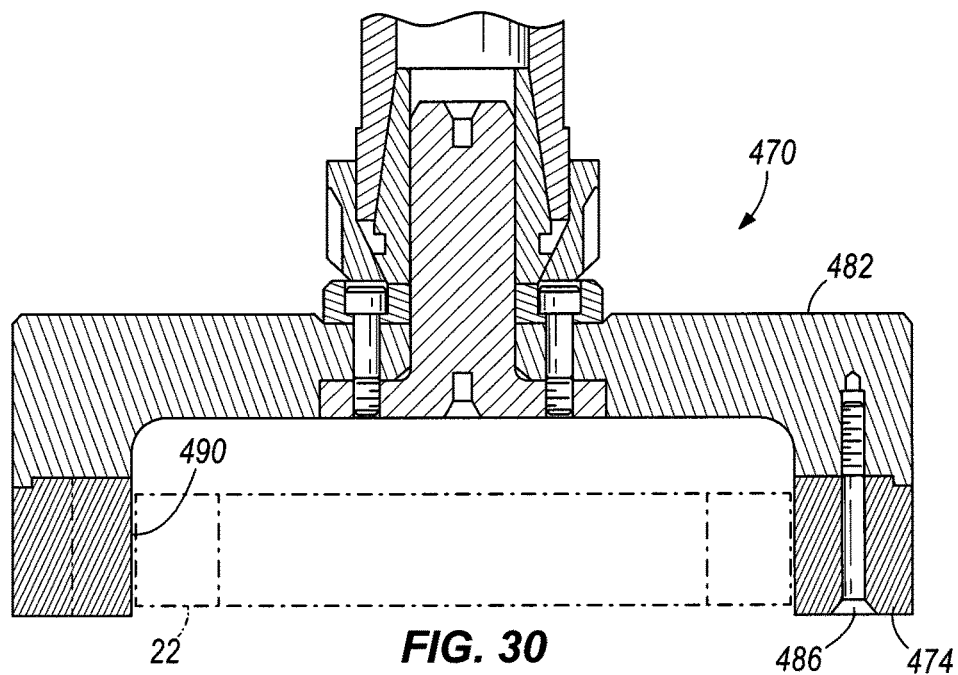
FIG. 30 is a partial cross-sectional view of yet another magnetic tool embodying the invention, and in which the magnetic arrangement takes the form of magnetized member.
Figure 31:
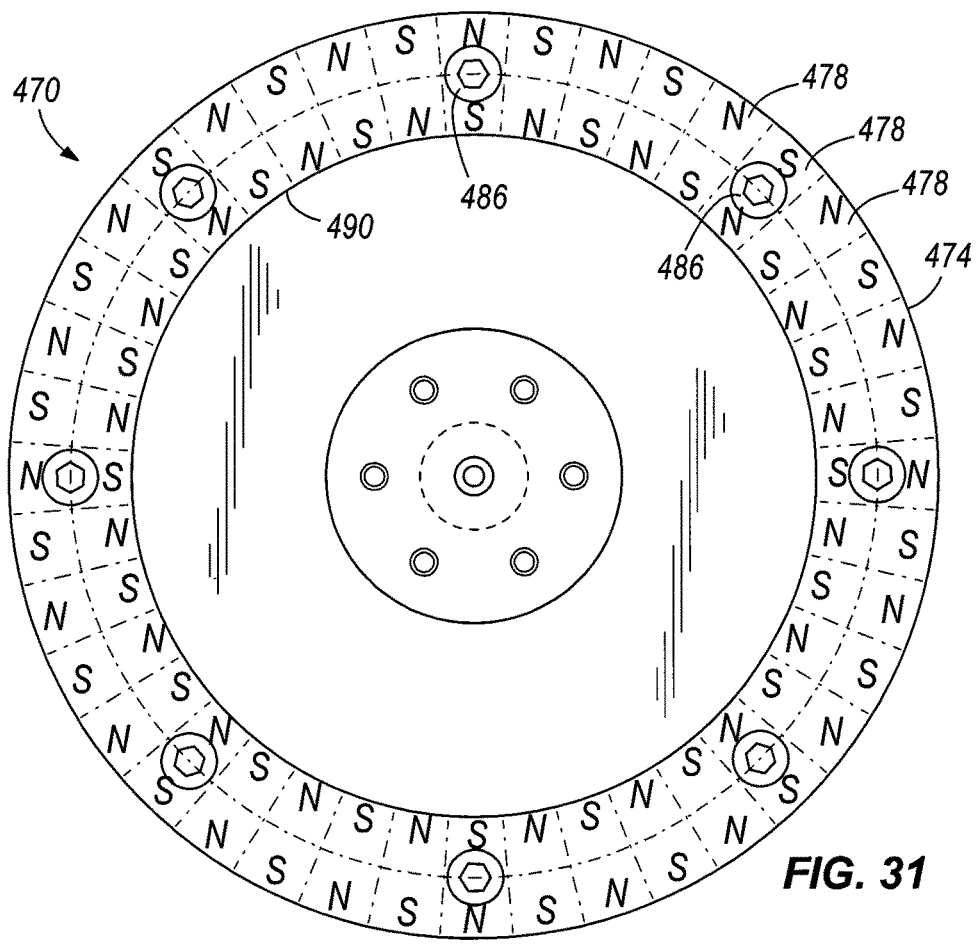
FIG. 31 is an end view of the magnetic tool of FIG. 30.

FIGS. 30 and 31 illustrate yet another magnetic tool 470 embodying the invention. The magnetic tool 470 is similar in many respects to the magnetic tool 134 described above except that the magnetic arrangement is different. More specifically, the magnetic arrangement of the tool 470 is not comprised of a plurality of individual permanent magnets, but instead takes the form of a member 474 that is magnetized to provide regions 478 of alternating polarity. The regions 478 take the place of individual magnets, but function in substantially the same manner as the individual magnets. Namely, the regions 478 provide regions of alternating polarity that enable the heating of the workpiece 22 via rotation of the member 474 relative to the workpiece 22.

As shown in FIGS. 30 and 31, the member 474 takes the form of a metal ring that is formed or machined to the desired shape, depending on the particular application. The ring can be formed from a powdered metal to allow for maximum shape selection. The same principles described above with respect FIGS. 18, 19, and 21-26 for the particular configurations of the magnetic arrangement can be applied to the formation and configuration of the ring. Additionally, cooling systems like those described above with respect to FIGS. 27a and 27b can be used with the member 474.

Once the desired shape is achieved, the metal ring is magnetized to provide the desired number and orientation of regions 478 to achieve the desired number of poles. As shown in FIG. 31, the member 474 includes forty regions, each having its north-south axis oriented radially. Adjacent regions 478 have alternating poles facing in the radially inward direction to achieve a similar effect to the arrangement described with respect to the magnetic tool 134. It is to be understood that other orientations of the regions 478 can be applied to the member 474 to achieve similar effects to the particular magnet arrangements of any of the different magnetic tools described in detail above. As used herein and in the appended claims, the term "magnetic arrangement" is intended to contemplate both the use of a plurality of individual permanent magnets as well as the use of a magnetized member like the member 474 or other magnetized members with regions that are configured like and achieve the same effects achieved by any of the individual magnet configurations described above.

After it is magnetized, the member 474 can be coupled to the body portion 482 of the magnetic tool 470 using one or more fasteners 486 and will define the surface 490 of the magnetic tool 470. It is to be understood that a plurality of different members 474, each having a different number of poles, a different configuration, etc. could be kept on hand for fast and easy interchangeability depending on the particular hardening application. Alternatively, the member 474 can be secured to the body portion 482 via other suitable fastening methods. In one alternative embodiment, the member 474 could be positioned in an annular channel defined in the body portion 482 so that the annular channel functions like the plurality of pockets into which individual magnets are placed in the embodiments described above. Namely, the annular channel could provide a thin wall portion that provides a thermal barrier between the member and the surface. A cover could secure the member 474 in the channel in a similar manner to the covers described above.

Various features and advantages of the invention are set forth in the following claims.

What is claimed is:

1. An apparatus for magnetic induction hardening of a workpiece, the apparatus comprising:
   a magnetic tool having
      a body portion formed of a generally non-magnetic material, the body portion having a surface configured to be positioned in close proximity to the workpiece being hardened, the surface of the body being a radially inwardly-facing circumferential surface configured for induction hardening an outer surface of the workpiece; and
      a magnetic arrangement coupled to the body portion at or adjacent the surface of the body portion and configured to provide regions of alternating polarity;
   a workpiece holder configured to support the workpiece in close proximity to the surface of the magnetic tool such that the workpiece is received in a bore formed in the magnetic tool and is surrounded by the magnetic arrangement; and
   a drive arrangement for rotating the magnetic tool relative to the workpiece holder about an axis of rotation to induce heating of the workpiece to achieve a temperature in the austenitic range of the workpiece for hardening of the workpiece through a microstructural transformation;
   wherein the magnetic tool includes a mounting portion coupled to the body portion and spaced from the magnetic arrangement, wherein the mounting portion includes a mounting shaft sized and configured to be received in a spindle, and wherein the drive arrangement includes a drive unit operable to rotate the spindle.

2. The apparatus of claim 1, further comprising a quenching system operable to quench the heated workpiece while it is supported by the workpiece holder.

3. The apparatus of claim 2, wherein the magnetic tool and the workpiece holder are movable relative to one another in a direction parallel to the axis of rotation between a first position for heating the workpiece, and a second position for quenching the workpiece.

4. The apparatus of claim 2, wherein the quenching system includes a quench collar surrounding the workpiece for showering the workpiece with a quenching medium.

5. The apparatus of claim 2, wherein the quenching system includes a conduit coupled to the workpiece holder to be positioned at least partially within the workpiece.

6. The apparatus of claim 1, wherein the magnetic arrangement includes a plurality of permanent magnets coupled to the body portion at or adjacent the surface and configured to provide the regions of alternating polarity.

7. The apparatus of claim 6, wherein the body portion includes a plurality of pockets formed therein and spaced from the surface such that a wall portion of the body portion is defined between the surface and each of the plurality of pockets, and wherein each of the plurality of magnets is positioned in a respective one of the plurality of pockets.

8. The apparatus of claim 7, wherein the wall portion is less than 0.05 inches thick.

9. The apparatus of claim 8, wherein the wall portion is about 0.02 inches thick.

10. The apparatus of claim 6, wherein the body portion includes a plurality of pockets formed therein, and wherein each of the plurality of magnets is positioned in a respective one of the plurality of pockets such that a surface of each of the plurality of magnets is exposed to at least partially define the surface of the body portion.

11. The apparatus of claim 1, wherein the mounting shaft and the plurality of magnets has a concentricity of about 0.004 inches or smaller.

12. The apparatus of claim 1, wherein the body portion is made of a material having low permeability.

13. The apparatus of claim 12, wherein the body portion is made of one of aluminum and austenitic stainless steel.

14. The apparatus of claim 1, wherein the magnetic tool further includes at least one flux concentrator.

15. The apparatus of claim 1, wherein the magnetic arrangement includes a plurality of regions each having a north-south axis, the magnetic arrangement being arranged such that a north-south axis of each of the plurality of regions extends in at least one of a generally radial direction and a generally axial direction.

16. The apparatus of claim 1, wherein the magnetic arrangement includes a plurality of regions each having a north-south axis, the magnetic arrangement being arranged such that a north-south axis of each of the plurality of regions extends in a generally circumferential direction.

17. The apparatus of claim 1, wherein the workpiece holder electrically isolates the workpiece from ground.

18. The apparatus of claim 1, wherein the workpiece holder supports the workpiece in a manner that accommodates thermal expansion of the workpiece.

19. The apparatus of claim 1, wherein the workpiece holder supports the workpiece at a distance spaced from the surface of the magnetic tool, the distance being less than about 0.07 inches.

20. The apparatus of claim 19, wherein the distance is about 0.02 inches to about 0.06 inches.

21. The apparatus of claim 1, wherein the magnetic arrangement defines a sufficient number of magnetic poles (nP) and the drive arrangement rotates the magnetic tool relative to the workpiece holder at a sufficient speed (RPM) to achieve a frequency of at least 5 kHz according to the equation Hz=(nP*RPM)/60.

22. The apparatus of claim 21, wherein the frequency is between 5 kHz and 21 kHz.

23. The apparatus of claim 1, wherein the magnetic arrangement defines a surface profile of a desired shape corresponding to a desired case hardening profile for the workpiece.

24. The apparatus of claim 1, wherein the magnetic arrangement defines a surface profile of a desired shape corresponding to a surface profile of the workpiece.

25. The apparatus of claim 1, wherein the magnetic arrangement includes a member that is magnetized to include a plurality of magnetic regions, the magnetic regions defining the regions of alternating polarity.

26. The apparatus of claim 25, wherein the magnetized member is a ring connected to the body portion, the ring defining the surface.

27. The apparatus of claim 1, further comprising an eddy current conduit positioned adjacent the surface and configured to conduct eddy current from the magnetic tool to a surface of the workpiece.

28. The apparatus of claim 27, wherein the eddy current conduit includes a lamination of silicon steel.

\* \* \* \* \*